United States Patent
Kronkright et al.

(10) Patent No.: US 10,836,554 B2
(45) Date of Patent: Nov. 17, 2020

(54) SYSTEM FOR TRANSPORTING FRAGILE OBJECTS

(71) Applicant: THE SUPPORTING ORGANIZATION FOR THE GEORGIA O'KEEFFE MUSEUM, Santa Fe, NM (US)

(72) Inventors: Dale Paul Kronkright, Santa Fe, NM (US); Alex Padilla, Santa Fe, NM (US); Patricia Witt, Santa Fe, NM (US)

(73) Assignee: The Supporting Organization for the Georgia O'Keefe Museum, Santa Fe, NM (US)

(*) Notice: Subject to any disclaimer, the term of this patent is extended or adjusted under 35 U.S.C. 154(b) by 140 days.

(21) Appl. No.: 15/995,476

(22) Filed: Jun. 1, 2018

(65) Prior Publication Data
US 2019/0367242 A1    Dec. 5, 2019

(51) Int. Cl.
| B65D 81/07 | (2006.01) |
| B65D 85/30 | (2006.01) |
| F16F 15/02 | (2006.01) |
| F16F 15/08 | (2006.01) |
| B65D 81/26 | (2006.01) |

(52) U.S. Cl.
CPC .......... *B65D 81/07* (2013.01); *B65D 81/266* (2013.01); *B65D 85/30* (2013.01); *F16F 15/022* (2013.01); *F16F 15/08* (2013.01)

(58) Field of Classification Search
CPC ........ B65D 81/07; B65D 85/30; B65D 81/02; F16F 15/022; F16F 15/08

USPC ....... 206/449, 453, 454, 455, 521, 583, 586, 206/588, 590–594, 204
See application file for complete search history.

(56) References Cited

U.S. PATENT DOCUMENTS

| 2,417,347 A | 3/1947 | Brown |
| 3,044,161 A * | 7/1962 | Morrison .............. F25D 23/063 29/445 |
| 3,268,199 A | 8/1966 | Kordyban et al. |
| 3,655,034 A | 4/1972 | Stollman et al. |

(Continued)

FOREIGN PATENT DOCUMENTS

| CA | 2826895 A1 * | 3/2014 | ............. B65D 81/07 |
| DE | 942207 U1 | 8/1997 | |

(Continued)

OTHER PUBLICATIONS

Mervin Richard "Art in Transit Handbook for Packing and Transporting Paintings", Nov. 1997.

(Continued)

*Primary Examiner* — Rafael A Ortiz
(74) *Attorney, Agent, or Firm* — Baker Botts L.L.P.

(57) ABSTRACT

According to certain embodiments, a vibration-isolating system comprises a platform adapted to carry one or more loads and an adjustable load-positioning system. The platform is suspended within a support structure by a plurality of isolators. The isolators are tuned to impede vibrations in a pre-determined frequency range for a payload having a pre-determined mass. The adjustable load-positioning system is adapted to facilitate positioning the one or more loads such that the payload having the pre-determined mass is centered at the center of gravity of the platform.

24 Claims, 10 Drawing Sheets

(56) References Cited

U.S. PATENT DOCUMENTS

| | | | |
|---|---|---|---|
| 3,690,540 A | | 9/1972 | Hardigg |
| 4,013,170 A | * | 3/1977 | Hutterer ................. B65D 81/07 206/521 |
| 4,015,715 A | | 4/1977 | Kelf |
| 4,749,164 A | * | 6/1988 | Leo ........................ B65D 81/07 248/27.3 |
| 4,766,708 A | * | 8/1988 | Sing .......................... E04B 1/98 52/167.8 |
| 4,856,626 A | | 8/1989 | Nakanishi |
| 4,865,200 A | | 9/1989 | Sullivan et al. |
| 4,877,136 A | | 10/1989 | Mizuno et al. |
| 5,100,096 A | | 3/1992 | Mizuno |
| 5,314,149 A | | 5/1994 | Pim et al. |
| 5,314,159 A | | 5/1994 | Szarata |
| 5,518,118 A | | 5/1996 | Pütz et al. |
| 5,595,301 A | | 1/1997 | Pütz et al. |
| 5,640,793 A | | 6/1997 | Fischer |
| 5,819,943 A | | 10/1998 | Depuy |
| 5,924,261 A | | 7/1999 | Fricke |
| 6,263,604 B1 | | 7/2001 | Williams |
| 6,305,545 B1 | | 10/2001 | Morrow |
| 6,540,080 B2 | | 4/2003 | Moreyra |
| 6,547,049 B1 | | 4/2003 | Tomlinson |
| 6,648,295 B2 | | 11/2003 | Herren et al. |
| 6,651,948 B2 | | 11/2003 | Szarata |
| 6,802,405 B2 | | 10/2004 | Barcock et al. |
| 6,923,298 B2 | | 8/2005 | Tanner |
| 7,140,508 B2 | | 11/2006 | Kuhn et al. |
| 7,644,820 B2 | | 1/2010 | Höhne et al. |
| 8,172,194 B2 | | 5/2012 | Cummins et al. |
| 8,322,532 B2 | | 12/2012 | Schafer |
| 2003/0051958 A1 | | 3/2003 | Esche |
| 2007/0012530 A1 | | 1/2007 | Garcia |
| 2007/0119794 A1 | | 5/2007 | Hidaka et al. |
| 2007/0131574 A1 | | 6/2007 | Aoki |
| 2010/0051778 A1 | * | 3/2010 | Wu ........................ F16F 15/022 248/562 |
| 2012/0138768 A1 | | 6/2012 | Anderssohn |
| 2013/0233760 A1 | | 9/2013 | Polando |
| 2014/0021665 A1 | | 1/2014 | Han et al. |
| 2016/0123422 A1 | | 5/2016 | Keinënen et al. |
| 2017/0036851 A1 | | 2/2017 | Kronkright et al. |
| 2017/0037926 A1 | | 2/2017 | Kronkright et al. |
| 2017/0037928 A1 | * | 2/2017 | Kronkright ............... F16F 7/01 |
| 2017/0291749 A1 | * | 10/2017 | Blackway .............. B65D 81/02 |
| 2017/0328442 A1 | * | 11/2017 | Gilbert .................... F16F 15/04 |

FOREIGN PATENT DOCUMENTS

| | | | | |
|---|---|---|---|---|
| EP | 0518803 A1 | * | 12/1992 | ............ B65D 81/07 |
| EP | 0842866 A1 | | 5/1998 | |
| EP | 1099876 | | 5/2001 | |
| EP | 2392836 A1 | | 12/2011 | |
| NL | 2018589 A | | 6/2017 | |
| WO | WO2018115808 | | 11/2017 | |
| WO | WO2018115809 | | 11/2017 | |
| WO | WO2018115810 | | 11/2017 | |

OTHER PUBLICATIONS

"Art in Transit Studies in the Transport of Paintings", "International Conference on the Packing and Transportation of Paintings", Sep. 9-Sep. 11, 1991.

Nobuyuki Kamba, Ph.D., "The Art of Packaging to Protect Cultural Assets", The Art of Innovation—Concept to Reality Summer/Fall 2012, pp. 4-7, 2012.

Rick Yamada, "Wire Rope Isolators: Shock and Vibration Mitigation in the Packing of Museum Artifacts", Paccin, Preparation, Art Handling, Collections Care Information Network, 11 pages, Mar. 31, 2014.

Extended European Search Report for corresponding European Application No. 19177205 dated Nov. 25, 2019.

* cited by examiner

SYSTEM FOR TRANSPORTING FRAGILE OBJECTS

TECHNICAL FIELD

Certain embodiments of the present disclosure relate to a system for transporting fragile objects.

BACKGROUND

Fragile objects may be at risk of becoming damaged when transported from one location to another. To minimize the risks, fragile objects are traditionally transported in wooden crates. The wooden crates are cushioned with foam intended to protect the fragile object in the event that the wooden crate is dropped. Unfortunately, traditional wooden crates may fail to adequately protect fragile objects from damage.

SUMMARY

Embodiments of the present disclosure may reduce the risk of a fragile object becoming damaged during transit. For example, disclosed herein is a vibration-isolating system.

According to certain embodiments, a vibration-isolating system comprises a platform adapted to carry one or more loads and an adjustable load-positioning system. The platform is suspended within a support structure by a plurality of isolators. The isolators are tuned to impede vibrations in a pre-determined frequency range for a payload having a pre-determined mass. The adjustable load-positioning system is adapted to facilitate positioning the one or more loads such that the payload having the pre-determined mass is centered at the center of gravity of the platform.

In some embodiments, the platform comprises a load-bearing surface having a rectangular shape and the plurality of isolators comprise first, second, third, and fourth wire rope isolators. The first wire rope isolator is positioned proximate a first corner of the load-bearing surface and the second wire rope isolator is positioned proximate a second corner of the load-bearing surface such that the second wire rope isolator diagonally opposes the first wire rope isolator. The third wire rope isolator is positioned proximate a third corner of the load-bearing surface and the fourth wire rope isolator is positioned proximate a fourth corner of the load-bearing surface such that the fourth wire rope isolator diagonally opposes the third wire rope isolator. In some embodiments, each of the first, second, third, and fourth wire rope isolators is a high energy rope mount (HERM) comprising a wire rope embedded in an elastomer.

In some embodiments, the first wire rope isolator comprises a plurality of loops. The loops are held in place by two brackets. Each bracket extends tangentially across the first wire rope isolator, and the two brackets are positioned on opposite sides of first wire rope isolator. The vibration-isolating system further comprises a mounting assembly that couples the first wire rope isolator to a rectangular frame that provides the support structure within which the platform is suspended. The mounting assembly comprises a first mount positioned in a corner of the rectangular frame such that the first mount couples diagonally between two sides of the rectangular frame. The first mount connects to one of the brackets of the first wire rope isolator. The mounting assembly comprises a second mount, which includes an angled portion that connects to the other bracket of the first wire rope isolator and a flat portion that couples to the platform proximate a corner of the platform. The first mount and the second mount hold the first wire rope isolator at an angle such that an axis through a diameter of the first wire rope isolator bisects the center of the load-bearing surface of the platform.

As discussed above, the isolators are tuned to impede vibrations in a pre-determined frequency range for a payload having a pre-determined mass. In some embodiments, the pre-determined frequency range encompasses 10-40 Hz and the pre-determined mass is in the range of 80-100 kilograms.

In some embodiments, the vibration-isolating system further comprises the one or more loads. The combined mass of the platform, the adjustable load-positioning system, and the one or more loads satisfies the pre-determined mass of the payload to which the plurality of isolators are tuned. In some embodiments, the one or more loads include at least one mass unit having a specified mass adapted to tune the combined mass of the platform, the adjustable load-positioning system, and the one or more loads to satisfy the pre-determined mass of the payload to which the plurality of isolators are tuned. In some embodiments, the mass unit comprises a thermal phase change material, an inelastic particulate material, or both.

In some embodiments, a first load of the one or more loads comprises a flexible panel (such as a painted canvas). In some embodiments, the first load further comprises a container assembly operable to protect the flexible panel. The container assembly comprises a back panel, a front panel, and a stiffener panel. The back panel is positioned behind the flexible panel and is offset by a first substantially airtight compartment. The front panel is positioned in front of the flexible panel and is offset by a second substantially airtight compartment. The stiffener panel is positioned in front of the front panel and is offset by a third substantially airtight compartment.

In some embodiments, the adjustable load-positioning system comprises one or more horizontal rails and one or more vertical rails. The horizontal rails facilitate moving a load along the length of the platform. The vertical rails facilitate moving the load along the height of the platform.

In some embodiments, the adjustable load-positioning system comprises a first shelf and a first set of brackets. The first shelf is adapted to support the bottom of a first load of the one or more loads. Each bracket of the first set of brackets has an L-shaped portion adapted to hold a respective corner of the first load. The adjustable load-positioning system facilitates sliding the first set of brackets to center the payload. The adjustable load-positioning system facilitates securing the first set of brackets in place once the payload has been centered.

In some embodiments, the vibration-isolating system comprises a case that either provides the support structure within which the platform is suspended or contains the support structure. The vibration-isolating system further comprises a second shelf and a second set of brackets. The second shelf is adapted to support the bottom of a second load of the one or more loads. Each bracket of the second set of brackets has an L-shaped portion adapted to hold a respective corner of the second load. The adjustable load-positioning system facilitates sliding the second set of brackets to center the payload. The adjustable-positioning system facilitates securing the second set of brackets in place once the payload has been centered. The first shelf and first set of brackets face the front of the case, and the second shelf and second set of brackets face the back of the case.

In some embodiments, the support structure within which the platform is suspended comprises a case. The case comprises a plurality of panels arranged to form walls of the case. The plurality of panels include a front panel that forms the front wall of the case and a back panel that forms the back wall of the case. The case further comprises a first set of locks that secure the front panel to the case and a second set of locks that secure the back panel to the case. The front panel is detachable when the first set of locks are unlocked, and the back panel is detachable when the second set of locks are unlocked. In some embodiments, the case further comprises a first set of guides adapted to align the front panel to the case and a second set of guides adapted to align the back panel to the case. In some embodiments, each of the plurality of panels comprises polypropylene honey comb panel in aluminum extrusion.

In some embodiments, the support structure within which the platform is suspended comprises a case, and the case includes an integrated base. The integrated base defines at least two apertures dimensioned to accommodate tynes of a fork lift. In some embodiments, the integrated base lowers the center of gravity of the case.

In some embodiments, the vibration-isolating system comprises a case that either provides the support structure within which the platform is suspended or contains the support structure. In some embodiments, one or more one or more shock-absorbing structures are positioned within the case. The shock-absorbing structures comprise polycarbonate, polypropylene, impact-endothermic open cell polyurethane foam, and/or expanded polystyrene (XPS). In some embodiments, one or more silica gel tiles and/or thermal phase change tiles are positioned within the case.

Certain embodiments of the present disclosure may provide one or more technical advantages. Certain embodiments may protect a canvas painting, art, or other fragile object from vibration and/or shock that can occur during transit. As an example, certain embodiments may provide a vibration-isolating case that impedes and dampen vibrations and/or reduces transmitted shock experienced by the object in transit. The case can be configured to isolate damaging frequencies and/or to absorb shock in the event that the case is dropped. As another example, certain embodiments may raise the natural frequency of the object. For example, the object may be arranged within a panel system that raises the natural frequency of the object well above its fundamental damage frequency. Raising the natural frequency may prevent resonance that would otherwise amplify vibrations across the object (such as vibrations encountered in transit vehicles). Certain embodiments may tune or customize protection based on the particular object being transported, for example, depending on the fundamental damage frequency of the object. Certain embodiments may have all, some, or none of these advantages. Other advantages will be apparent to persons of ordinary skill in the art.

DETAILED DESCRIPTION

Figure 1:
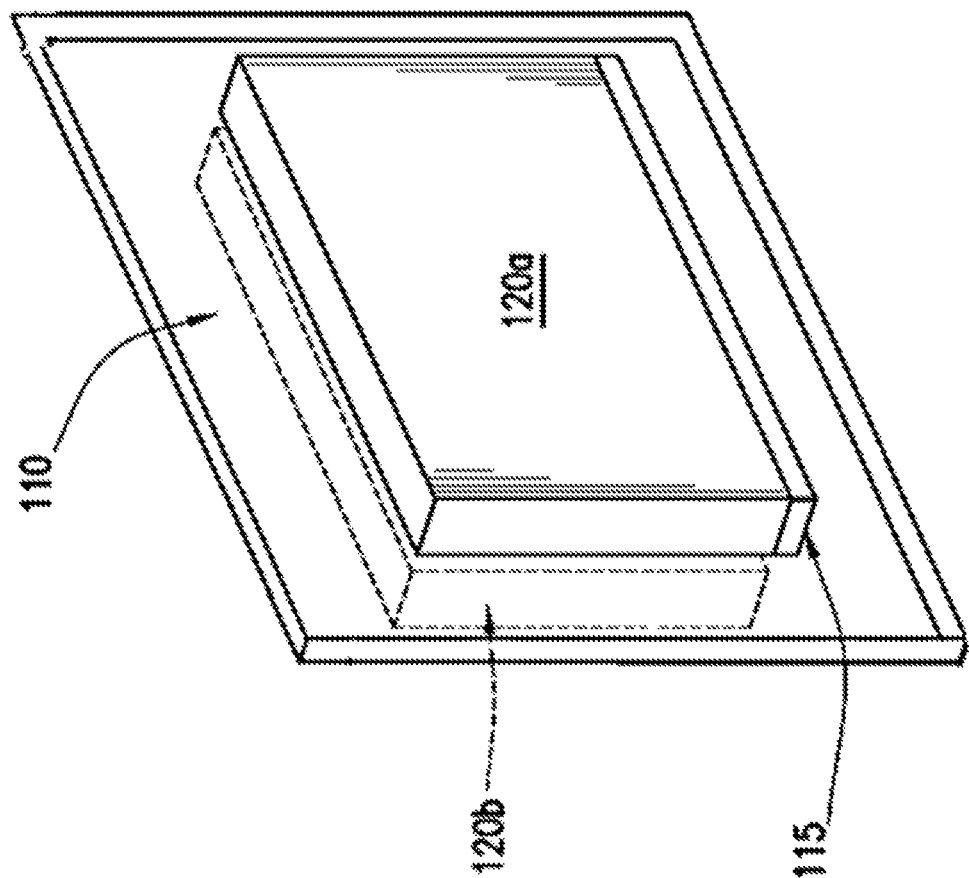
FIG. 1 illustrates an example of a platform for carrying a load, in accordance with certain embodiments of the present disclosure.
Figure 1:
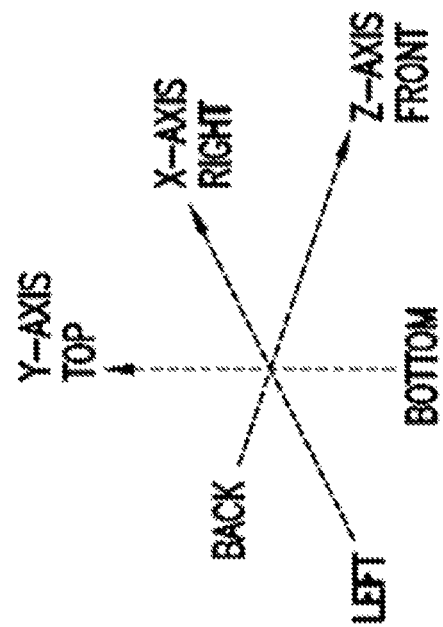

Fragile objects are traditionally transported in wooden crates cushioned with foam. The foam is intended to protect the fragile object in the event that the wooden crate is dropped or in a collision. Traditional wooden crates, however, may fail to adequately protect the fragile object from damage. For example, the fragile object may be subjected to significant vibrations when transported by a truck, aircraft, or other vehicle. As the encountered transit vibrations approach the resonant frequencies of the fragile object, those vibrations cause the fragile object to vibrate with increasing amplitude, stressing the materials and structures of the object which in cracks or other damage. As an example, the fragile object may be a painting on a canvas. When resonant vibrations occur, the canvas oscillates and the paints restrain the canvas movement through tension and compression thereby damping the kinetic energy of the canvas. If the stresses to the adhesion and cohesion bonds remaining in the aged paints exceed stress limits, the paint will crack and separate either at the point of adhesion of the paint to the canvas or between paint layers. The paint layers increasingly transform from a semi-continuous film to a series of fragmented sections. Every time a crack forms, that crack becomes the focal point of movement in that area. As more movement occurs, the canvas and paints become more and more damaged at the cracks. As the painting ages, it tends to become less flexible and more brittle. Thus older paintings are increasingly prone to damage as a result of travel vibrations.

The most damaging transit-related vibrations generally occur at frequencies similar to the object's natural frequency. At the object's natural frequency, resonance occurs that amplifies movement in the fragile object. The natural and resonant frequencies of a painting will generally be in the range of approximately 5-50 Hz and the natural frequency of a glass sculpture or ceramic will generally be in the range of approximately 150-1000 Hz. In developing the systems and methods disclosed herein, it was discovered that traditional wooden crates not only fail to reduce damaging vibrations, they transmit and actually amplify many vibrations through additive interference. For example, testing was performed on a traditional wooden crate configured with accelerometers and scanning laser vibrometers placed or focused on a painting, on the foam cushioning, on the wooden crate, and on the bed of the truck transporting the painting. The testing underscored the data suggested in US MIL-STD-810 for common commercial truck carriers that transit vibrations are greatest in the regions of 10-60 Hz and 100-160 Hz. Testing further demonstrated that traditional wood crates and foam crates have relatively low natural and resonant frequencies (approximately 20-100 Hz) and therefore amplify transit vibrations through additive interference in damaging low frequency ranges. At every configuration in which foam was used, vibration across the fragile payload increased. For example, the displacement energy experienced by a painting cushioned in foam was worse than if the painting had been placed directly on the bed of the truck. By amplifying the displacement energy, the foam increased the risk of damage to the painting.

The results obtained by testing the foam were unexpected because conventionally foam was thought to be beneficial for protecting fragile objects and because foam behaves differently when observed on its own as compared to when it is observed carrying a load. Both in product literature and in experimental tests on engineering shaker tables and actual road tests, cushioning foams made from open-cell polyurethane (PEU) and extruded, closed-cell polyethylene foams exhibit consistent natural frequencies between 3 Hz-100 Hz, depending upon the configurations used as container cushions and the payload compressions created. These are precisely the frequencies transmitted in all modes of motor, rail and air freight transportation. Because the input vibration frequencies approximate or replicate the natural frequencies of the foam cushions, both the cushions and the wood walls of the crate move into phase and amplify the transmitted excursions of the truck bed or wall. Embodiments of the current system seek to resolve this problem by creating components which can predictably raise the natural frequency of the payload without mechanical contact and by tuning the suspension system to affect critical damping of input vibration energies.

Certain embodiments of the present disclosure may provide solutions to this and other problems associated with traditional systems for transporting fragile objects. For example, certain embodiments may reduce exposure to vibration frequencies that would otherwise damage a fragile object in transit, such as vibrations in lower frequency ranges (e.g., vibrations less than approximately 150 Hz, vibrations less than approximately 100 Hz, or other frequencies depending on the natural frequency of the object being transported). Certain embodiments use a suspension system to provide tunable protection from vibration and shock. The suspension system includes a platform to carry the object. The platform connects to isolators that suspend the platform. The isolators may be tunable to impede vibrations occurring at the natural frequency and/or raise the natural frequency of the load to a frequency sufficiently above the fundamental damage frequency of the object. The tuning of the isolators can be improved by centering the load at the center of gravity of the suspension frame and using diagonally opposed isolators tuned to a specific mass. Disclosed herein is an adjustable load-positioning system that allows for centering the load at the center of gravity to improve the tuning of the isolators.

In certain embodiments, the suspension system may be packed inside a vibration-isolating case. In addition, if the fragile object is substantially flat, the fragile object may be packaged using a panel system, for example, prior to being loaded onto the platform of the suspension system and/or being packed inside the vibration-isolating case. The panel system provides protection during transit by controlling motion across the fragile object. In general, the panel system places the substantially flat object, such as a painting, between panels on the front and back sides of the object. Substantially airtight air gaps between the flat object and the panels increase stiffness that reduces vibration movement across the flat object. Additional panels may be used to increase stiffness.

For a more complete understanding of the present invention and the advantages thereof, reference is now made to the following description and the accompanying drawings, wherein like numerals are used for like and corresponding parts of the various drawings.

FIG. 1 illustrates an example of components of a suspension system for transporting and storing a load, in accordance with certain embodiments of the present disclosure. The components may include a platform 110 configured to carry a load 120. For purposes of explanation, FIG. 1 illustrates the orientation of platform 110 relative to an x-axis extending in the direction of platform 110's length (e.g., from left to right), a y-axis extending in the direction of platform 110's height (e.g., from top to bottom), and a z-axis extending in the direction of platform 110's width (e.g., from front to back). In the example illustrated in FIG. 1, platform 110 provides a flat, load-bearing surface to support load 120 in an x-y plane. As illustrated in FIG. 1, the load-bearing surface may have a rectangular shape (e.g., a generally four-sided surface in which the sides can all be the same length, such as a square, or different lengths, such as an oblong rectangle, and the corners can be perpendicular, rounded, or beveled). Platform 110 may comprise any suitable material, such as metal, plastic, wood, cardboard, etc. In certain preferred embodiments, platform 110 comprises rigid material having a high natural frequency, for example, platform 110 comprises one or more light-weight aluminum honeycomb panels.

Load 120 includes an object 300, such as a painting, drawing, sculpture, artifact, museum specimen, or other fragile object. In some embodiments, the load may further include packaging. For example, object 300 may be packaged within a container assembly, such as the panel system described with respect to FIGS. 8-9 below. Panel 110, load 120, and/or object 300 can optionally be enclosed within a box or other protective covering, such as a weatherproof (or rain proof) cover comprising stretch wrap, polyfilm, KEVLAR®, life raft material, vinyl, thermal blanket, and/or other suitable material.

Load 120 may be secured to platform 110 using one or more latches and/or other securing mechanisms. An example of an adjustable load-positioning system that may be used in securing load 120 to platform 110 is further discussed below with respect to FIG. 5. In certain embodiments, platform 110 may carry more than one load. As an example, multiple loads 120 could be carried on the same surface of platform 110 (not shown). As another example, FIG. 1 illustrates a first load 120*a* on a first surface of platform 110 and a second load 120*b* on the opposite surface of platform 110.

Platform 110 optionally includes a shelf 115. In some embodiments, shelf 115 may be coupled directly to platform 110 or extruded from platform 110, such as a flange that projects outward in the x-z plane to further support load 120. In other embodiments, shelf 115 may be attached to an adjustable load-positioning system, such as an adjustable rail system that couples to platform. To carry loads on opposite surfaces, platform 110 may include a first shelf portion extending from the front side of the platform and a second shelf portion extending from the back side of the platform. The first and second shelf portions can be separate shelves, or they can be a single shelf that wraps around platform 110 or is bisected by platform 110.

Figure 2A:
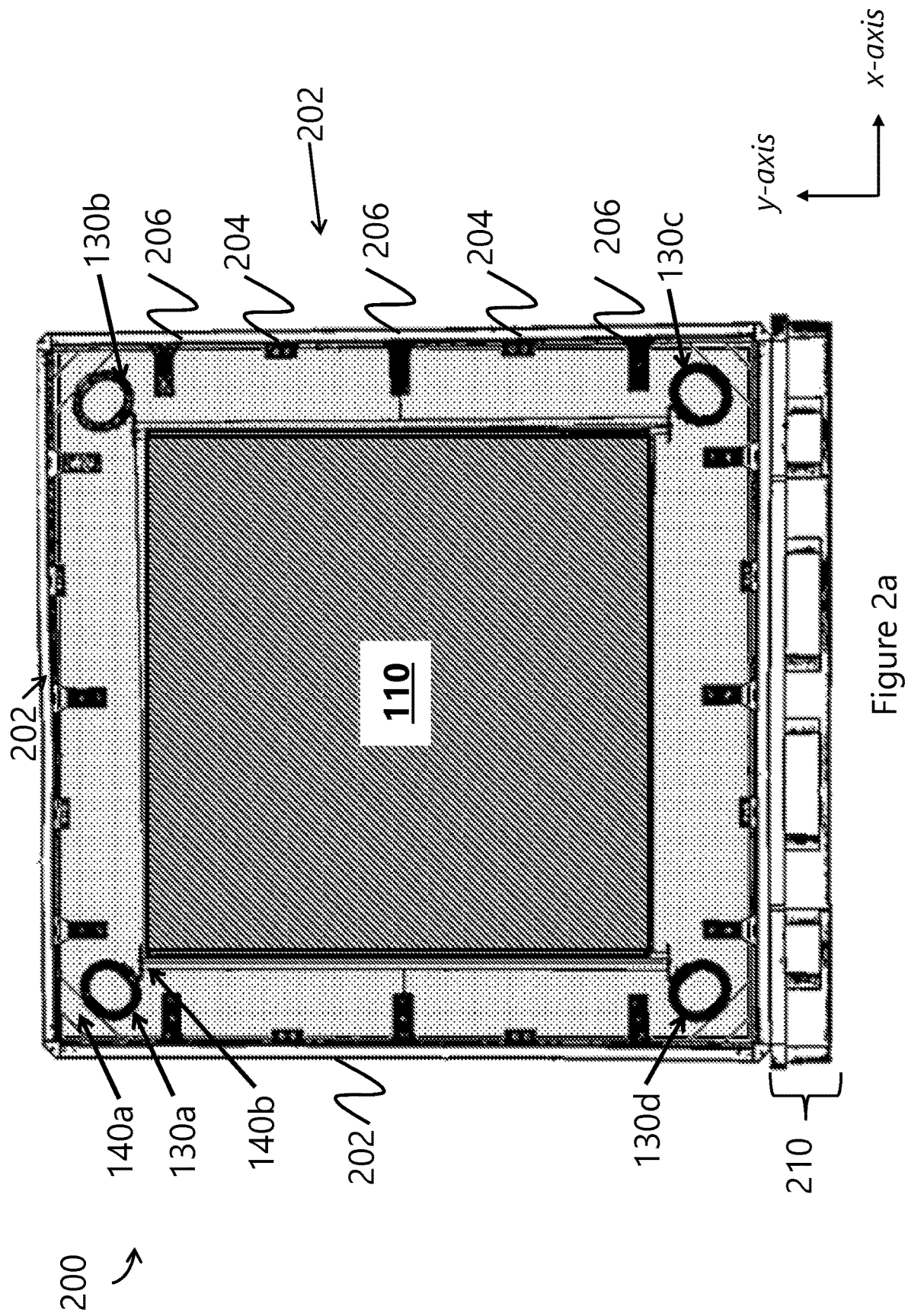
FIGS. 2a-2b illustrates an example of a case for transporting a platform that carries a load, in accordance with certain embodiments of the present disclosure.

Platform 110 may be suspended within a support structure. In certain embodiments, isolators 130 suspend platform 110 such that platform 110 is in a vertical orientation when the support structure is upright. In some embodiments, the vibration-isolating system includes a case and the case itself provides the support structure that suspends platform 110. FIG. 2A, discussed below, provides an example in which the case itself provides the support structure (e.g., top, bottom, left, and right walls 202 of case 200 provide a support structure for mounting the isolators 130 that suspend platform 110). In other embodiments, the support structure may be a separate component, such as a structure that can be contained within a case during transit and can be removed from the case when loading or unloading platform 110. In some embodiments, the support structure comprises a rectangular frame (e.g., a generally four-sided frame in which the sides can all be the same length, such as a square, or different lengths, such as an oblong rectangle, and the corners can be perpendicular, rounded, or beveled). Depending on the embodiment, the rectangular frame can either be defined by walls of the case (e.g., top, bottom, left, and right walls 202 of case 200 form a rectangular frame for suspending platform 110), or the rectangular frame can be a separate, removable frame that can optionally be contained within the case.

FIG. 2a illustrates an embodiment of a case 200 within which platform 110 may be suspended. In certain embodiments, case 200 may comprise a plurality of walls 202, one or more guides 204, one or more locks 206, and/or a base 210. Case 200 may be any case suitable to contain platform 110 carrying one or more loads 120. In certain embodiments, case 200 may be a custom case. The custom case may be built using parts listed on a parts list. In certain embodiments, the parts may be standard parts, which may help to ensure that the parts are reliable and readily available from various manufacturers. Standard parts refer to parts that are based on specifications defined by a standards group, such as the ASTM International, the International Organization for Standardization (ISO) or other standards groups. In certain embodiments, the parts list may include the materials and dimensions of panels to be used as walls 202, the number and type of guides 204, the number and type of locks 206, the number and type of fasteners for coupling the components of case 200 together, and/or any other suitable parts.

The dimensions of walls 202 may be specified to accommodate the size of the items to be contained within case 200. In an embodiment, walls 202 may be dimensioned to accommodate a suspension system that can carry a painting up to 44×44 inches. As an example, to accommodate a suspension that can carry a painting of this size, walls 202 may be dimensioned such that the overall dimensions of case 200 are approximately 80 inches long, 80 inches tall, and 35 inches wide. By dimensioning case 200 with a relatively large width (such as a width greater than or equal to 35% of the height of case 200), the risk of case 200 being tipped over is substantially reduced. Other embodiments may be dimensioned to accommodate a smaller or larger load. In certain embodiments, case 200 may be configured to weigh approximately 180 kilograms when loaded, which may be similar to the weight of a conventional wooden crate for carrying a painting of a similar size. In some embodiments, case 200 uses lighter materials at the top and heavier materials at the bottom to lower the center of gravity and improve stability compared to a conventional wooden crate.

In certain embodiments, walls 202 comprises any suitable rigid, high natural frequency, puncture-resistant material, such as metal, plastic, synthetic composite or honeycomb structure, and/or other suitable material. In certain embodiments, each wall 202 may be a panel that can couple to one or more of the other walls 202 using one or more types of fasteners, such as channels, screws, bolts, hinges, locking mechanisms (e.g., locks 206), snaps, gaskets, adhesives, or other suitable fasteners. The material for the panels may be selected to impart certain properties, such as lightweight, sturdy, scalable in size, effective at reducing vibrations, puncture resistant, and/or able to provide protection from the elements (e.g., moisture, heat, dust, etc.). An example of such a material includes polypropylene honey comb in aluminum extrusion. Polypropylene honey comb in aluminum extrusion may reduce or eliminate vibrations, for example, certain panels made of this material have been shown to reduce or eliminate vibrations less than 500 Hz.

In some embodiments, the panel may include a Kevlar-like facing that reduces puncture risk. In addition, or in the alternative, in some embodiments, a skin may be applied to one or more surfaces of the panel. As an example, a replaceable skin made of vinyl or similar material may be applied to one or more outward-facing wall panels of case 200. The skin may protect the panels from abrasion or dirt. In some embodiments, a skin may be removable so that it can be replaced if it begins to show signs of wear and tear (e.g., dirt, scratches, etc.). In certain embodiments, the skin may have a color or a design, such as a logo or a case number, which may help distinguish case 200 from other cases.

Although the previous example describes using a custom case, in other embodiments, case 200 may be a commercial case, such as a case manufactured by PELICAN™, STORM CASE™, FAWIC™, or some other manufacturer. Examples include a resilient, plastic-composite walled case that is weather-proof, water-proof, acoustically-sealed, resilient (e.g., able to retain its shape after an impact), shock-absorbing, and puncture-resistant, such as a polypropylene honeycomb sandwich panel-walled FAWIC™ case with aluminum extrusion corners and seams or a roto-molded polyethylene PELICAN™ case.

Case 200 may comprise front, back, left, right, top, and bottom sides. The bottom side of case 200 may be positioned to take the gravitational load during transit, and the top side of case 200 may be positioned opposite the bottom side. For purposes of explanation, the front and back sides of case 200 may extend along the length of the object being transported, as depicted by the x-axis in FIG. 1, and the left and right sides may extend along the width of the object being transported, as depicted by the z-axis in FIG. 1.

Case 200 may comprise one or more doors for accessing the interior of the case. A door may comprise any suitable mechanism for opening and closing the case, and the door may be positioned in any suitable location. In certain embodiments, the doors may be configured to allow case 200 to be loaded and unloaded while in the upright position, without having to lay case 200 on the ground (i.e., without having to move case 200 from a vertical orientation to a horizontal orientation). Loading in the upright position may allow for safer and more efficient handling of the load, including the option of loading case 200 from both the front and the back.

Figure 2B:
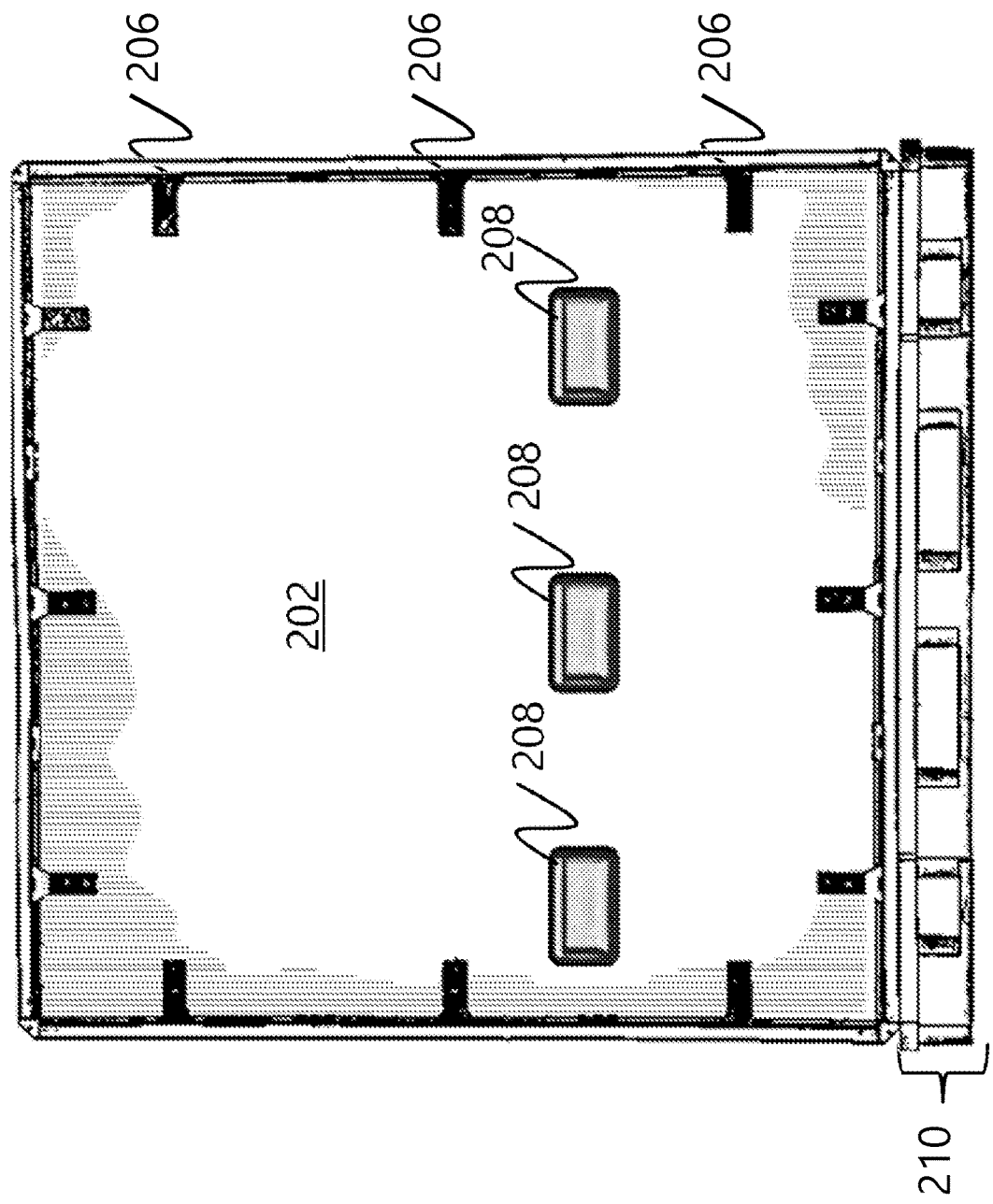

In certain embodiments, one or more walls 202 can operate as one or more doors. For example, FIG. 2b illustrates an example in which the front wall 202 can be a removable panel that operates as a door. FIG. 2b illustrates the front wall 202 in the closed/latched position. Front wall 202 can be unlatched/separated in order to load the front side of platform 110 (as shown in FIG. 2a). Similarly, back wall 202 can be a removable panel that can be unlatched/separated to load the back side of platform 110. Although the previous example describes the front and/or back walls 202 as being removable, in other embodiments, the front and/or back walls 202 may be hinged to a portion of case 200. In certain embodiments, the door may allow another portion of case 200 to be detached and reattached to case 200. As an example, a top portion and bottom portion of case 200 could be latched together when case 200 is closed and unlatched/separated when case 200 is open. In certain embodiments, a door could be built into one of the sides of case 200. Thus, an entire wall 202 and/or a portion of wall 202 can operate as a door depending on the embodiment.

For any of the types of doors discussed above, a gasket, such as a bead gasket, may go all the way around the seams of the opening to which each door attaches in order to provide a waterproof seal that prevents moisture and debris from getting into case 200 when the panel is secured to case 202 (i.e., when the doors are closed).

In certain embodiments, case 200 comprises one or more guides 204. FIG. 2a shows an example in which the top, bottom, left, and right walls 202 of case 200 each include two guides 204 for aligning with the front wall 202. Other embodiments may use more or fewer guides 204, for example, depending on the size of case 200 or the type of door used for case 200. In certain embodiments, guides 204 may comprise ball bearings. In certain embodiments, spring-loaded alignment snaps may be used as guides 204. The snaps may comprise pairs of female and male connectors that snap together when the door is closed. Guides 204 may be made of any suitable material, such as metal or plastic. As an example, guides 204 may be made of stainless steel. Guides 204 allow for aligning removable doors, such as the removable wall panels discussed above. For example, when attaching a removable panel, guides 204 allow for positioning the panel in the correct alignment for securely closing case 200 and aligning locks 206 such that fewer technicians may be required to close case 200. Once the guides 204 are engaged with the removable panel, guides 204 may hold the panel in place such that removing the panel would require a technician to apply pressure, for example, by pulling handles 208 shown in FIG. 2b. Thus, guides 204 may prevent the removable panel from unexpectedly detaching, which may prevent injury to the technician or damage to objects within case 200.

Case 200 may further comprise one or more locks 206. Locks 206 may hold doors in a closed position. In certain embodiments, locks 206 provide a waterproof and/or vapor proof seal at a specified pressure (such as 70-90 psi, e.g., 80 psi). In certain embodiments, camlocks or are used for locks 206. In some embodiments, a lock 206 may include a push button for unlatching the lock. In certain embodiments, locks 206 include a keyed lock, a combination lock, a digital or radio frequency identification (RFID) lock, or other security mechanism to prevent an unauthorized person from obtaining access to the contents of case 200. FIG. 2a shows an example in which the top, bottom, left, and right walls 202 of case 200 each include three locks 206 for locking with the front wall 202. Other embodiments may use more or fewer locks 206, for example, depending on the size of case 200 or the type of door used for case 200.

In certain embodiments, case 200 may include one or more environmental buffers. Examples of environmental buffers include thermal buffers (such as insulation layers or thermal phase change tiles) and humidity buffers (such as conditioned silica gel tiles). For example, in certain embodiments, the interior-facing surface of one or more wall panels may be lined with thermal insulation. Certain environmental buffers may be implemented using one or more tiles positioned within case 200. In certain embodiments, the tiles snap onto an interior surface of case 200, such as the interior of a door. In addition, or in the alternative, certain embodiments position environmental buffers within case 200 by placing one or more environmental buffers on or within platform 110. As an example, thermal phase change material may be encased within platform 110. Encasing the thermal phase change material within platform 110 may protect the tiles from damage, shock, and leakage and may ensure that the tiles are sufficiently close to load 120 to buffer the temperature surrounding load 120.

An example of encasing thermal phase change material within platform 110 includes placing one or more thermal phase change tiles between a first panel (e.g., a front-facing panel) and a second panel (e.g., a back-facing panel) of platform 110. In other words, platform 110 may comprise thermal phase change material sandwiched between the first panel and the second panel. In certain embodiments, the first and second panels may comprise aluminum honeycomb panels that encase thermal phase change tiles within an epoxy adhesive matrix.

In certain embodiments, each thermal phase change tile measures approximately 5½×5½×1 inches (14×14×2.5 centimeters) and weighs approximately 300 grams (10.4 ounces). Within the temperature range of 15 to 30 degrees Celsius, each tile contains 50 British Thermal Units (BTU) of reserve thermal mass. Assuming a rate of 200 BTU reserve per 1.5 cubic meter of enclosed space in order to add or subtract 15 degrees Fahrenheit, and an average enclosed space of 1.5 cubic meters for a medium sized case 200, four tiles could be embedded within voids created between the front- and back-facing panels of platform 110. Thermal phase change material may be obtained from Cryopak™ or other manufacturers.

Optionally, case 200 may be configured with one or more shock absorbing structures to absorb impact and prevent damage to the object in transit. For example, in certain embodiments, the shock absorbing structures may compress or collapse quickly in the event of a shock (such as a drop or collision) and expand slowly after the shock to reduce rebound movement of platform 110. In addition, or in the alternative, certain shock absorbing structures compress quickly in the event of a shock (such as a drop or collision) but do not decompress. Using a material that does not decompress may avoid rebound movement. If the structure remains compressed, it can be used as an indicator to identify whether case 200 was handled improperly. This information can be used in making an insurance claim for mishandling in transit. Examples of shock absorbing structures include replaceable honeycomb, fluted, and/or corrugated shaped structures composed of paper, polypropylene, polycarbonate, polystyrene (e.g., closed cell expanded polystyrene (XPS) core), and/or any suitable combination of the preceding. The selection of shape(s) and material(s) of the shock absorbing structures depends upon the weight of the payload and the shock impulse to be absorbed. In certain embodiments, an inexpensive paper honeycomb material may be used as a first, easily replaced shock-absorbing structure, and the paper honeycomb material may be underlaid with a more expensive but greater-energy absorbing plastic honeycomb or polystyrene structure and impact-endothermic open cell polyurethane foam (smartfoam, Poron XRD, D30 and similar) to absorb shock from a catastrophic impact. Shock absorbing structures may be placed in any location that may be susceptible to shock, such as toward the bottom of case 200. In certain embodiments, shock absorbing structures may be placed within isolators 130. For example, wire rope isolators can include a plurality of loops 132, and shock absorbing structures may optionally be placed within loops 132 to protect isolators 130 in the event of a shock.

In certain embodiments, case 200 and/or panel 110 may comprise one or more latches and one or more points-of-attachment for the latches (such as a latch channel). A latch may extend across load 120 to help secure load 120 onto platform 110. Any suitable latch may be used, such as a metal bar or a fabric strap. In certain embodiments, a metal bar (such as an aluminum bar) may be preferable to a fabric strap because a fabric strap may tend to amplify vibrations in damaging frequency ranges. In certain embodiments, the adjustable load-positioning system described below with respect to FIG. 5 may be used (with or without a fabric strap, metal bar, or other such latch) to secure load 120 onto platform 110.

FIG. 2a further illustrates that platform 110 couples to case 200 via one or more mounting assemblies. Each mounting assembly may include an isolator 130, a first mount 140a that couples isolator 130 to one or more walls 202 of case 200, and a second mount 140b that couples isolator 130 to platform 110 suspended within case 200. In general, isolators 130 reduce movement of platform 110 carrying load 120. As an example, isolators 130 may reduce vibrations that can occur when transporting platform 110 by truck, aircraft, or other vehicle. As another example, isolators 130 may dampen the impact on platform 110 in the event that case 200 carrying platform 110 is dropped, such as in the event that case 200 experiences a 1 to 3 foot drop.

Any suitable isolators 130 may be used. Examples of isolators 130 include wire rope isolators, rubber air bladders, inflatables, smartfoam, or other structures operable to suspend platform 110. In certain embodiments, high energy rope mounts (HERMs) may be used as isolators 130. An example of a HERM is further discussed below with respect to FIG. 4. Various embodiments may comprise one type of isolator 130 (e.g., wire rope isolators only) or multiple types of isolators (e.g., wire rope isolators and smartfoam isolators). Isolators 130 are configured such that platform 110 is oriented in a substantially vertical direction relative to the ground when case 200 is oriented in an upright position. When case 200 is transported in the upright position, isolators 130 dampen vibrations effecting the load 120 carried by platform 110 suspended within case 200.

Figure 3:
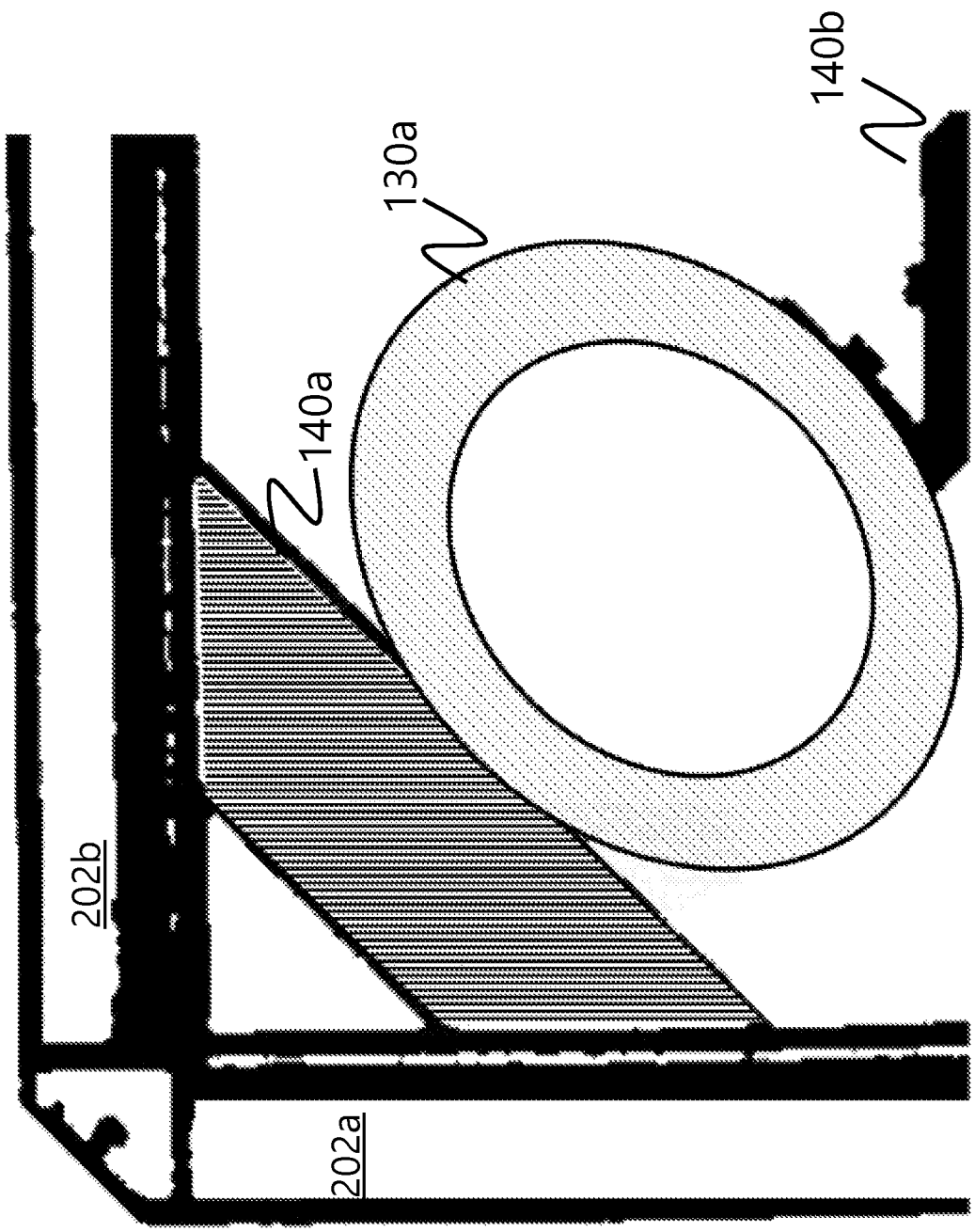
FIG. 3 illustrates an example of a mounting assembly for mounting a platform in the case of FIGS. 2a-2b, in accordance with certain embodiments of the present disclosure.

FIG. 3 illustrates a close-up view of a mounting assembly comprising an isolator 130, a first mount 140a, and a second mount 140b. In the example, isolator 130 is illustrated as a wire rope isolator, such as a HERM. FIG. 3 illustrates first mount 140a positioned in a corner formed between a first wall 202 (e.g., left wall) and a second wall 202 (e.g., top wall) of case 200 such that first mount 140a couples diagonally between the left wall and the top wall. First mount 140a generally connects tangentially to isolator 130 in order to hold isolator 130 at an angle relative to platform 110. Second mount 140b includes a first portion that generally connects tangentially to isolator 130, for example, at a location of isolator 130 opposite from first mount 140a, and helps to hold isolator 130 at an angle relative to platform 110. Second mount 140b may further comprise a second portion that couples to platform 110. As can be seen with reference to FIG. 2a, the portion of second mount 140b that couples to platform 110 is generally positioned flush with platform 110 proximate a corner of platform 110. In certain embodiments, first mount 140a and second mount 140b hold isolator 130 at an angle (e.g., 45 degrees relative to the x-axis) such that an axis through the diameter of isolator 130 in the xy-plane bisects the center of platform 110.

Figure 4:
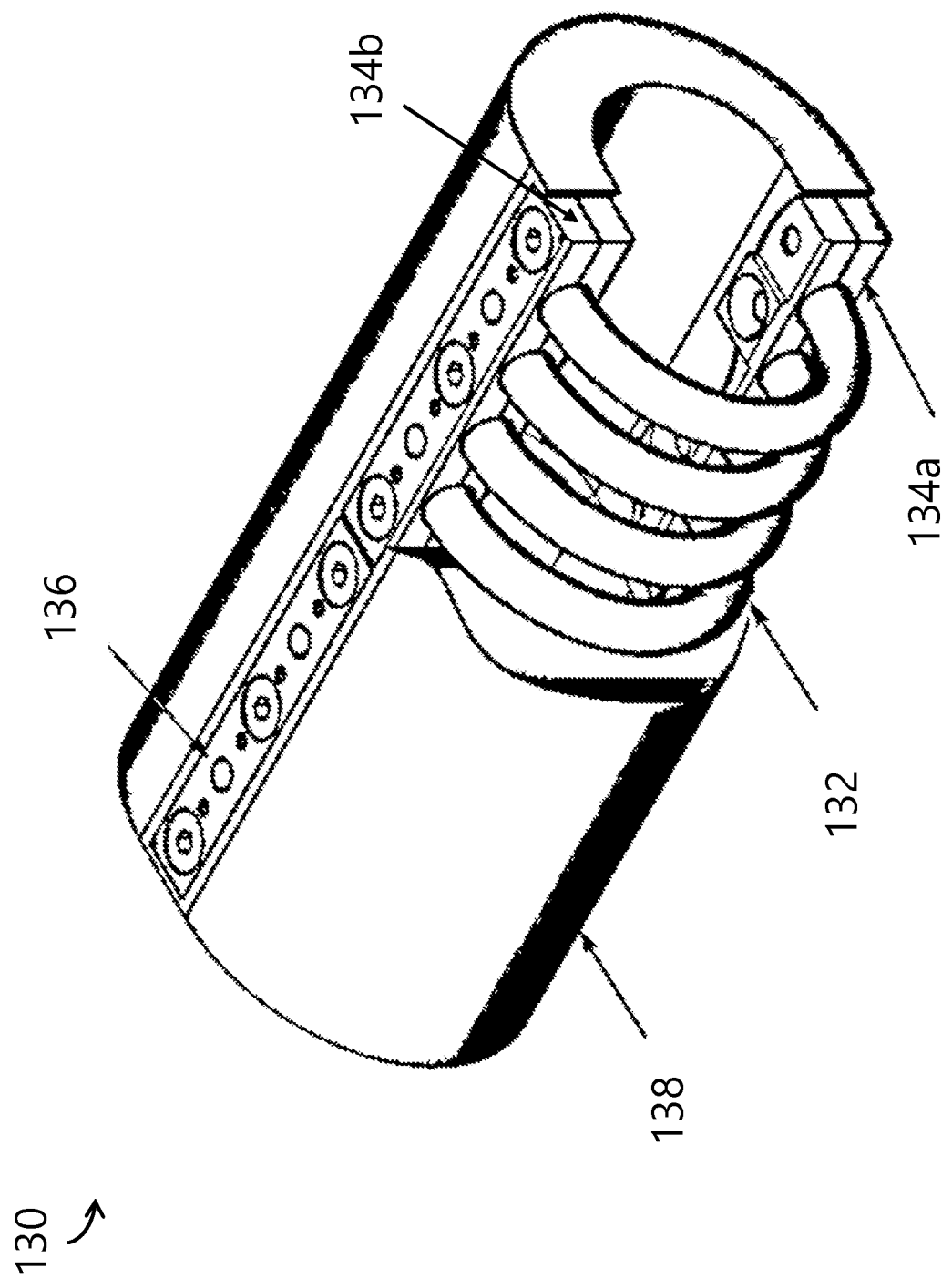
FIG. 4 illustrates an example of an isolator that may be used in the mounting assembly of FIG. 3, in accordance with certain embodiments of the present disclosure.

FIG. 4 illustrates an example of an isolator 130, in accordance with certain embodiments of the present disclosure. In particular, FIG. 4 illustrates a HERM, which is a type of wire rope isolator. Each HERM may comprise a coil-like structure having a plurality of loops 132 held together by one or more brackets 134. In certain embodiments, loops 132 are made from wire rope. The diameter of loops 132, the spacing between loops 132, and the thickness of the wire may be tuned based on the frequencies to be isolated by the isolator. In certain embodiments, the HERM may include a first bracket 134 operable to attach to first mount 140a and a second bracket 134 operable to attach to second mount 140b. In the illustration, bracket 134 comprises a plurality of mounting holes 136 through which a bolt, screw, or other fastener may attach bracket 134 to mount 140. The HERM further comprises an overmolded material, such as an elastomer (e.g., neoprene, natural rubber, etc.), which adds energy damping to the HERM. For purposes of illustration, FIG. 4 shows a portion of the overmolded material as removed so that loops 132 are visible in the drawing. It should be understood that, in practice, the overmolded material would embed loops 132. A HERM may act as a non-linear spring (i.e., the resistance of the HERM increases as the force upon it increases).

The HERM illustrated in FIG. 4 may be manufactured to hold a specific mass and to have a known/specified natural frequency. As an example, a HERM with a natural frequency around 5 Hz may be effective at reducing vibrations between 8 and 40 Hz. At vibrations below 8 Hz, case 200 and platform 110 move as a rigid solid so that there is no stress on load 120 (e.g., a painting) due to frequencies below 8 Hz.

In certain embodiments, the suspended platform 110 may be made self-centering. For example, isolators 130 (such as the HERM illustrated in FIG. 4) can be configured to minimize the extent to which platform 110 carrying load 120 moves from its initial position in response to vibration and/or shock. The initial position can be referred to as point (0, 0, 0) relative to the x-axis, y-axis, and z-axis. Return of platform 110 to the initial position (0, 0, 0) after an excursion relative to the exterior shell can be optimized by arranging isolators to oppose one another. For example, assume that a first wire rope isolator ("WRI-1") opposes a second wire rope isolator ("WRI-2"). A movement that pushes WRI-1 would pull the opposing WRI-2 such that when WRI-1 undergoes compression, the opposing WRI-2 undergoes tension, and vice versa. Thus, opposing wire rope isolators 130 keep the net effect of the movement as close to neutral as possible.

Figure 5:
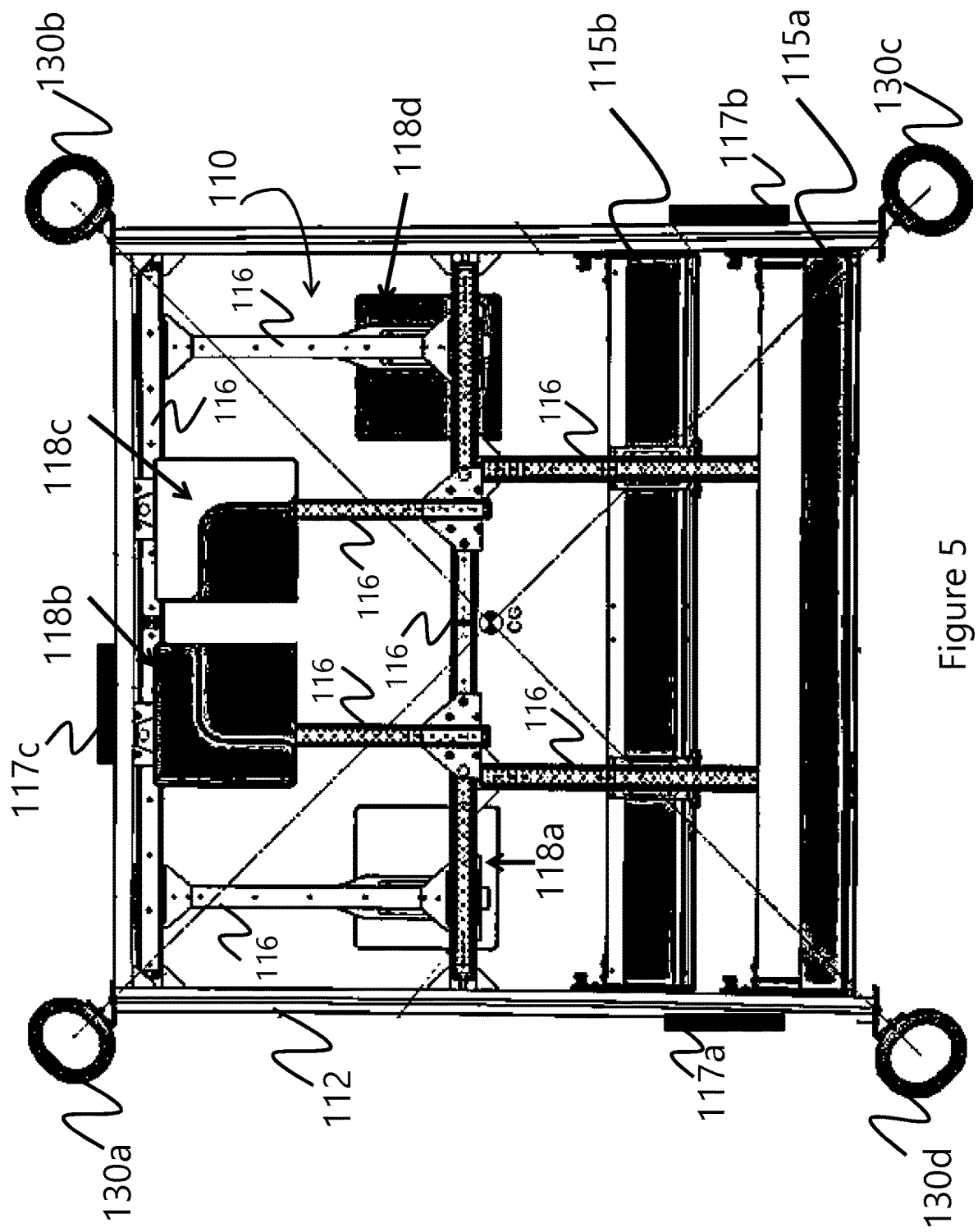
FIG. 5 illustrates an example of an adjustable load-positioning system for securing a load to a platform, in accordance with certain embodiments of the present disclosure.

In the example illustrated in FIG. 2a, returning platform 110 to its initial point is accomplished at least in part by configuring a wire rope isolator proximate to each corner of platform 110. Wire rope isolator 130a at the top left corner of platform 110 is in opposition to wire rope isolator 130c at the bottom right of platform 110, and wire rope isolator 130b at the top right of platform 110 is in opposition to wire rope isolator 130d at the bottom left of platform 110. The opposing wire rope isolator(s) 130 may be aligned. For example, an axis through the diameter of isolator 130a in the xy-plane may align with an axis through the diameter of isolator 130c in the xy-plane to bisect the center of platform 110. Similarly, an axis through the diameter of isolator 130b in the xy-plane may align with an axis through the diameter of isolator 130d in the xy-plane to bisect the center of platform 110. FIG. 5 illustrates an example of aligning each axis to bisect the center ("CG") of platform 110.

In certain embodiments, the suspension system may be configured such that each wire rope isolator 130 is in a state of slight compression when platform 110 is in its initial position (0, 0, 0). Thus, the suspension system can respond to movements that cause one wire rope isolator 130 to undergo increased compression without immediately causing the opposing wire rope isolator 130 to undergo tension such that the net movement of platform 110 is gradual and kept to a minimum.

Wire rope isolators can be tuned to accommodate both the load 120 and the natural frequency of the load 120, thus achieving critical damping of transportation-induced vibrations. Tuning can include selecting loop spacing, loop diameter, wire thickness, number of wires in a rope braid, number of loops, number of isolators 130, angle of orientation of isolators 130 relative to platform 110, position of isolators 130 relative to platform 110, and so on. As an example, as the weight of load 120 increases, wire thickness 137 can be increased, loop diameter 136 can be decreased, and/or the number of loops can be increased. In certain embodiments, wire rope isolators 130 are tuned to yield a tuning ratio greater than or equal to 1.4. The tuning ratio is determined by dividing a natural frequency of an object that the vibration-isolating system protects by a natural frequency of the vibration-isolating system. In certain embodiments, wire rope isolators 130 can be tuned to isolate one or more frequencies in the range of approximately 8-50 Hz, depending on the object that the vibration-isolation system protects.

In certain embodiments, wire rope isolators 130 may be tuned separately depending on their position within the suspension system. Wire rope isolators 130 positioned proximate the bottom side of platform 110 (the gravitational load-bearing side of platform 110) tend to experience heavier loading and may therefore be tuned to support more weight than wire rope isolators 130 positioned proximate the top side, right side, and/or left side of platform 110. Thus, rope isolators 130 positioned proximate the bottom side of platform 110 can be tuned to support more weight. As an example, wire rope isolator(s) 130 positioned proximate the bottom side of platform 110 can have a different wire thickness, number of wires in a rope braid, number of loops in the wire rope isolator, and/or loop diameter than wire rope isolator(s) 130 positioned proximate the top side of platform 110. As another example, wire rope isolators 130a and 130b at the top of platform 110 can be tuned to provide more flexibility and wire rope isolators 130c and 130d may be tuned to provide more rigidity. This may allow platform 110 to provide an inverted-pendulum movement such that the gravitational load-bearing side at the bottom of platform 110 stays relatively steady relative to the top of platform 110. In other embodiments, wire rope isolators 130a, 130b, 130c, and 130d may all be the same type of isolator (e.g., the isolators may all be the same model of HERM with the same tuning properties, such as wire thickness, number of wires in a rope braid, number of loops in the wire rope isolator, and/or loop diameter).

In certain embodiments, a foam structure can be positioned through a space formed by loops 132 of wire rope isolator 130 (e.g., the foam structure can be placed through the space at the core of wire rope isolator 130). The foam structure is operable to act as a safety stop to provide impact attenuation and prevent wire rope isolator 130 from crimping or creasing in the event of a drop or similar impact. For example, FIG. 4 illustrates embodiments in which wire rope isolator (HERM) 130 includes two brackets 134a and 134b. The foam structure can be positioned between the first bracket 134a and the second bracket 134b to prevent the first bracket 134a from coming into contact with the second bracket 134b in the event of a drop or similar impact. The foam structure may be made of material that is soft and cushy in low-impulse environments (e.g., impulses due to vibrations) and that stiffens in high-impulse environments (e.g., impulse due to dropping case 200). For example, the foam structure may comprise an impact-responsive, variable stiffness foam such as smartfoam, urethane foam (for example PoronXRD urethane), or other material that can compress rapidly and form chemical crosslinks that stiffen and absorb energy in high-impulse environments. The foam structure may have any suitable shape, such as a block shape, a cylindrical shape, or, more generally, a mass of foam. In certain embodiments, the width/diameter of the foam structure is approximately half of loop diameter 136. This may allow some air space for wire rope isolator 130 to flex in low-impulse environments without engaging the foam structure. In certain embodiments, each wire rope isolator (e.g., isolators 130a-130d) can be configured with a foam structure as a safety stop.

FIG. 5 illustrates an example of an adjustable load-positioning system for securing a load to a platform, in accordance with certain embodiments of the present disclosure. The tuning of isolators 130 can be improved by centering load 120 at the center of gravity of suspended platform 110 and using diametrically opposed isolators tuned to a specific mass. An adjustable load-positioning system such as that shown in FIG. 5 allows for centering load 120 at the center of gravity to improve the tuning of isolators 130.

In the example embodiment shown in FIG. 5, the adjustable load-positioning system comprises a plurality of adjustable rails 116 that allow for moving load 120 in any suitable direction. In a preferred embodiment, rails 116 allow for moving load 120 in the up-and-down direction (e.g., in the direction of the y-axis of platform 110) and in the left-and-right direction (e.g., in the direction of the x-axis of platform 110). In certain embodiments, rails 116 may couple together with brackets that allow for sliding the rails 116 into position and locking rails 116 in place once the load is centered. In some embodiments, rails 116 may become rigid under tension such that rails 116 lock into place. Other locking mechanisms, such as a latch, may be used in addition or in alternative to the tension-based locking. Platform 110 may be considered centered when a level positioned along the x-axis of platform 110 becomes plum.

FIG. 5 further illustrates that the adjustable load-positioning system may include one or more shelves 115 and/or one or more brackets 118 for holding load 120 in place. In the example shown in FIG. 5, shelf 115a is configured to hold the bottom of a front-facing load 120a and shelf 115b is configured to hold the bottom of a back-facing load 120b. In certain embodiments, shelf 115 has trough shape such that a front portion of shelf 115 may help to hold load 120 in place in the front-to-back direction. In other embodiments, shelf 115 is generally flat. In some embodiments, shelf 115a and shelf 115b can each be configured to move up and down rails 116 to facilitate balancing the loads 120a, 120b. For example, the adjustable load-positioning system may allow for sliding shelf 115a and/or shelf 115b to center the payload and then securing shelf 115a and/or shelf 115b in place once the payload has been centered. In other embodiments, shelf 115a and shelf 115b may each have a fixed location, which may be toward the bottom of platform 110 to lower the center of gravity of case 200 and allow headroom for a taller load 120.

In the example shown in FIG. 5, brackets 118 comprise an L-shaped portion that allows for holding a corner of load 120. For example, bracket 118b is configured to hold a top left corner of front-facing load 120a and bracket 118c is configured to hold a top right corner of front-facing load 120a. Similarly, brackets 118a and 118d are configured to hold the top corners of back-facing load 120b. Brackets 118 can each be configured to move up, down, left, and right along rails 116 to facilitate balancing the loads 120a, 120b. Optionally, bracket 118 may comprise a rigid portion, such as a metal brace, to maintain the shape of bracket 118 under the pressure of load 120.

Shelves 115 and brackets 118 may be added or removed depending on how many loads 120 are to be carried by platform 110. Shelves 115 and/or brackets 118 may optionally comprises a padding material, such as soft foam, which may prevent damaging load 120 (e.g., when load 120 is being loaded/unloaded or is in transit). Additionally, or in the alternative, shelves 115 and/or brackets 118 may comprise a grip material that reduces sliding along the surface of shelves 115 and/or brackets 118.

In certain embodiments, mass units 117 can be added to platform 110 to facilitate centering platform 110 at its center of gravity. For example, the exterior framework 112 of platform 110 may be made with mini-tech channel extruded aluminum so that mass units 117 can be bolted wherever more mass is needed to center platform 110 (e.g., mass units 117 can be added to the left, right, top, bottom, front, or back until a level positioned along the x-axis of platform 110 becomes plum). Additionally, the mass units 117 can be used to ensure that platform 110 carries the amount of mass to which isolators 130 have been tuned. Thus, the mass units 117 compensate for load 120 having too little mass (e.g., if paintings carried by platform 110 are lighter than the mass to which isolators 130 have been tuned). Each mass unit can have a standardized or specified mass to simplify calculating the mass added by the mass units 117. In certain embodiments, space may be reserved between the exterior framework 112 of platform 110 and the exterior shell of case 200 (e.g., walls 202) to allow room for adding mass units 117. As an example, the space may be 8-14 inches deep. In certain embodiments, the mass units 117 are aluminum units containing phase change material to help maintain a stable temperature inside case 200. In certain embodiments, the mass units 117 comprise inelastic particulate, such as lead shot, which may help dampen vibrations of platform 110. In some embodiments, the inelastic particulate may be suspended in gel. Alternatively, the inelastic particulate may be surrounded by air.

If platform 110 is not centered or is not loaded with sufficient mass, platform 110 may experience sway up to several inches in any direction. To minimize sway, it is important that the payload matches the mass to which the isolators 130 are tuned and is positioned such that platform 110 is centered at its center of gravity. As an example, suppose isolators 130 are tuned to a fixed mass of 90 kilograms such that vibrations in the critical range (e.g., 8-40 Hz) are not transmitted to the platform or payload when the load is approximately 90 kilograms and centered. More generally, to effectively impede transmission of a specific range of vibrations, the payload should be matched with the isolators 130 (in other words, isolators 130 should be tuned to the payload).

As an example, the vibration-isolating system may be adapted to carry one or more paintings (e.g., stretched canvas painted with artwork). In certain embodiments, isolators 130 may be tuned to impede vibrations in a pre-determined frequency range for a payload having a predetermined mass. In certain embodiments, the predetermined frequency range is selected in order to lower the natural frequency down to a frequency at which the vibration isolating system vibrates as a rigid solid without stressing the canvas and without vibrating at the resonant frequency (e.g., first, second, or third drum) of the canvas. In certain embodiments, the predetermined frequency range to be dampened begins at approximately 8-10 Hz and ends at approximately 40-50 Hz, such as 8-40 Hz, 8-50 Hz, 10-40 Hz, or 10-50 Hz, among others. In certain embodiments, the pre-determined mass is between 80-100 kilograms, such as 90 kilograms.

Suppose the isolators 130 are tuned to impede vibrations in the pre-determined frequency range of 10-50 Hz for a payload having a pre-determined mass of 90 kilograms. The painting(s) (i.e., the one or more loads) in this example are considered to satisfy the pre-determined mass of the payload to which the plurality of isolators are tuned if they lower the natural frequency down to a frequency below 10 Hz. Suppose the platform with the adjustable load-positioning system weighs 50 kilograms. As a first example, suppose loading the painting(s) plus any optional mass units 117 adds 35 kilograms (such that the combined weight of the platform, adjustable load-positioning system, painting(s), and optional mass units 117 is 85 kilograms), which causes the natural frequency to be lowered to 9 Hz. As a second example, suppose loading the painting(s) plus any optional mass units 117 adds 40 kilograms (such that the combined weight of the platform, adjustable load-positioning system, painting(s), and optional mass units 117 is 90 kilograms), which causes the natural frequency to be lowered to 8 Hz. As a third example, suppose loading the painting(s) plus any optional mass units 117 adds 45 kilograms (such that the combined weight of the platform, adjustable load-positioning system, painting(s), and optional mass units 117 is 95 kilograms), which causes the natural frequency to be lowered to 7 Hz. Each of the three examples (85 kilogram, 90 kilogram, and 95 kilogram) is considered to satisfy the pre-determined mass to which the system is tuned because each of the three examples impedes frequencies in the pre-determined range of 10-50 Hz.

In other embodiments, different isolators 130 could be specified (e.g., wire thickness, number of loops, loop diameter, loop spacing, and/or number of wires in a rope braid could be adjusted) in order to tune the isolators to impede vibrations in the pre-determined frequency range of 10-50 Hz for a payload having a different pre-determined mass, such as 50 kilograms for a smaller case or 120 kilograms for a larger case, or other suitable value. Similarly, in other embodiments, different isolators 130 could be specified (e.g., wire thickness, number of loops, loop diameter, loop spacing, and/or number of wires in a rope braid could be adjusted) in order to tune the isolators to impede vibrations in a different pre-determined frequency range, depending on the resonant frequency of the load.

As discussed above, in certain embodiments, platform 110 is suspended by four wire rope isolators 130 (e.g., HERMs). Isolators 130a, 130b, 130c, and 130d are mounted in the corners of case 200 and are coupled proximate the corners of platform 110 such that isolator 130a is diagonally opposed to isolator 130c and isolator 130b is diagonally opposed to isolator 130d (see e.g., FIG. 5). This configuration of isolators 130 (e.g., HERMs) together with an adjustable load-positioning system that allows for centering the payload around the center of gravity of platform 110 may be well-suited to impeding vibrations in the range of approximately 10-50 Hz. For example, this configuration of isolators 130 together with the adjustable load-positioning system may improve dampening of vibrations in the critical range as compared to previous solutions, such as those described in U.S. Patent Publication 2017/0037928. In the previous solution many isolators (e.g., 10 isolators) were paired such that the pairs of isolators were opposed in the front-to-back, left-to-right, and top-to-bottom directions. However, the isolators in the previous solution were not diagonally opposed and the platform in the previous solution lacked a mechanism for centering the load at the center of gravity of platform 110. Thus, although each isolator in the previous solution was self-centering vis-à-vis its respective paired isolator, all of the isolators as a group were creating harmonic additive interference that did not impede vibrations in all directions as effectively as the configuration of isolators 130 disclosed herein.

Figure 6:
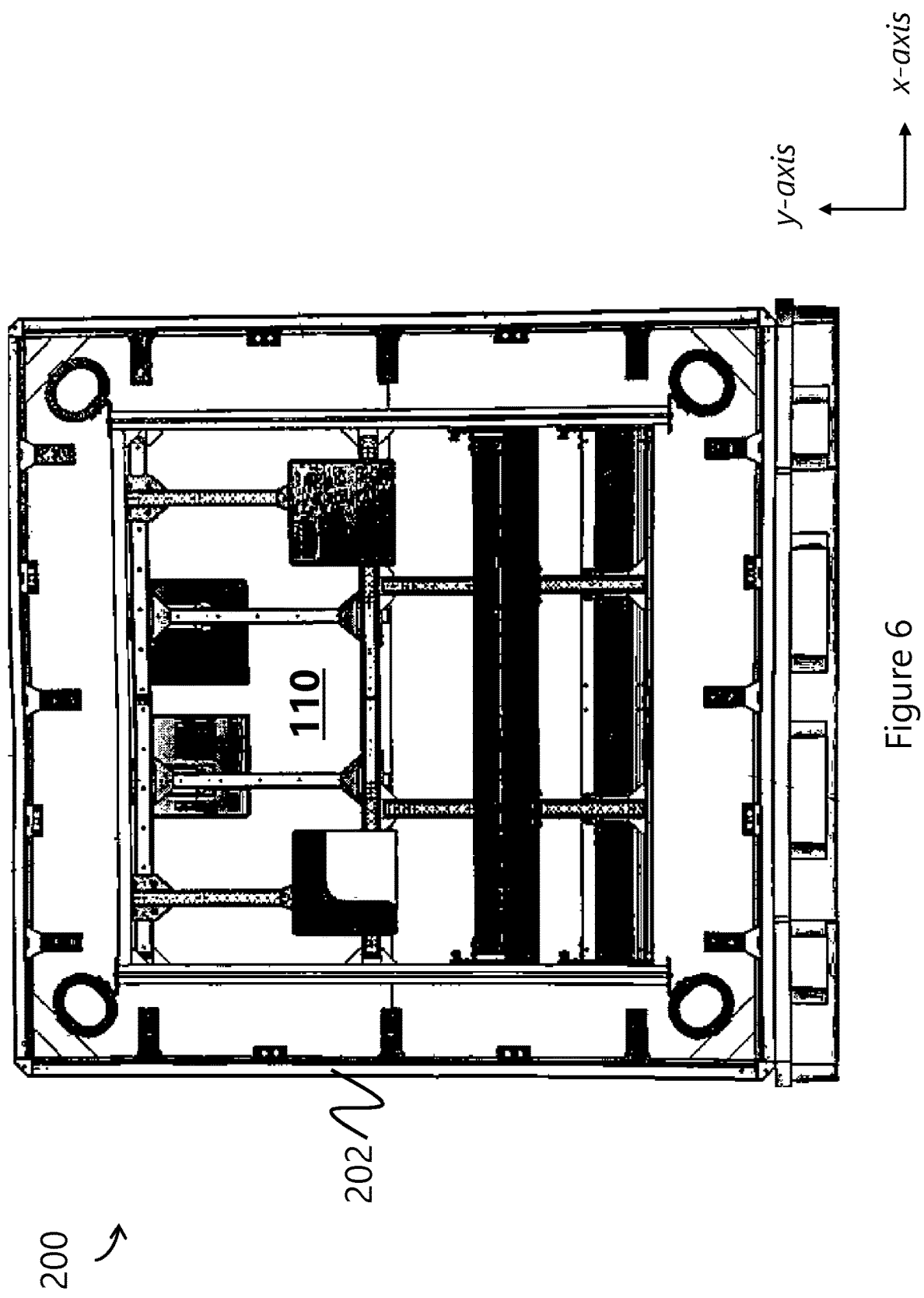
FIG. 6 illustrates an example of a platform comprising an adjustable load-positioning system being mounted within the case of FIGS. 2a-2b, in accordance with certain embodiments of the present disclosure.

FIG. 6 illustrates an example of a platform comprising an adjustable load-positioning system being mounted within the case of FIG. 2*a*, in accordance with certain embodiments of the present disclosure.

Figure 7:
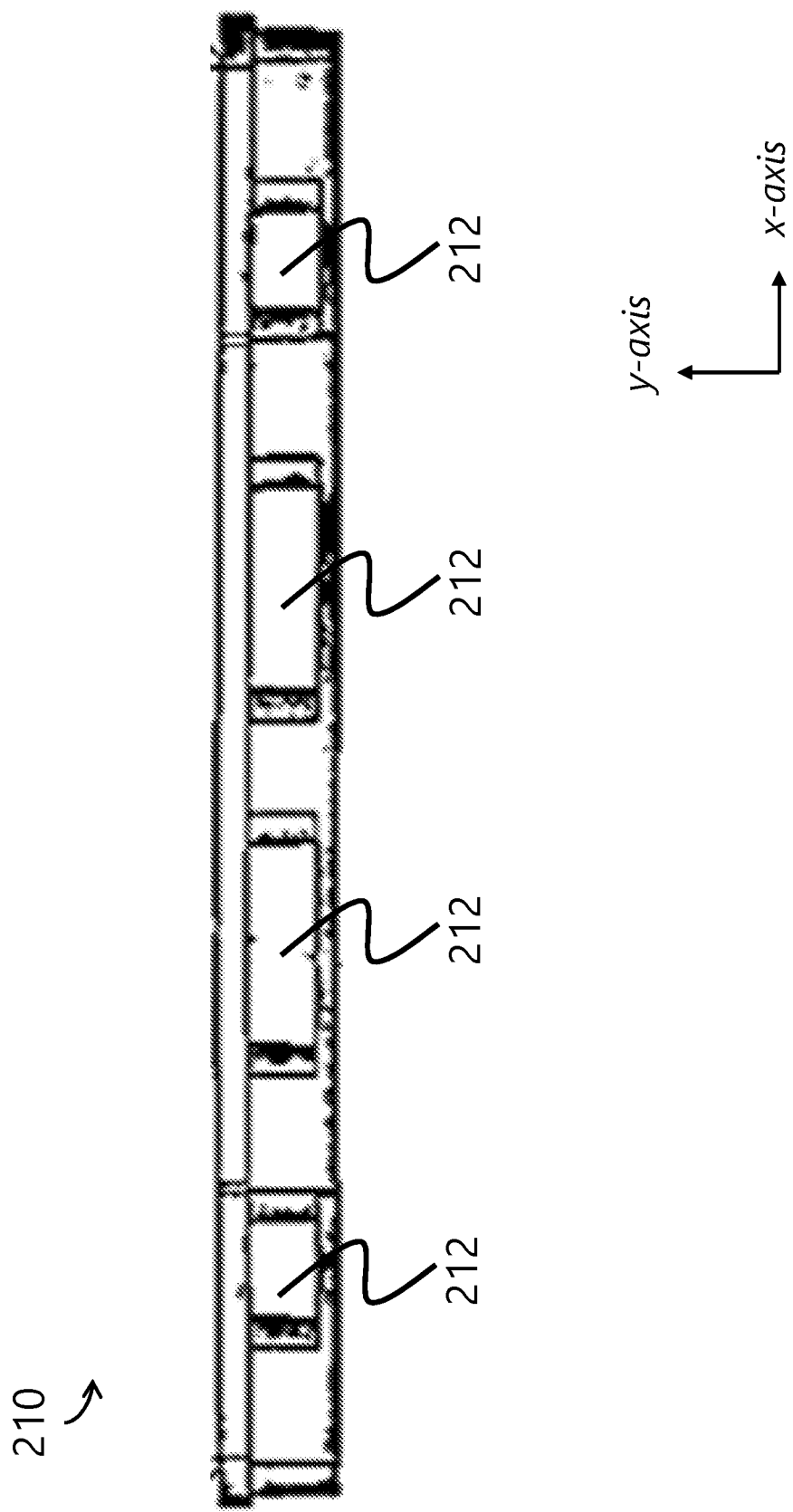
FIG. 7 illustrates an example of a base for the case of FIGS. 2a-2b, in accordance with certain embodiments of the present disclosure.

FIG. 7 illustrates an example of a base 210 for the case 200 of FIG. 2*a*, in accordance with certain embodiments of the present disclosure. In certain embodiments, base 210 is integrated with case 200 and lowers the center of gravity of case 200. In certain embodiments, base 210 defines a plurality of apertures 212. Apertures 212 are dimensioned to provide a space through which tynes of a fork lift or pallet jack may pick up the case. Base 210 may make it easier and safer to move case 200 by reducing the likelihood that a fork lift tips case 200 or penetrates case 200. Base 210 may comprise any suitable material, such as molded polyethylene. In certain embodiments, base 210 may be coupled to bottom wall 202 of case 200 by one or more fasteners such as one or more nails, screws, bolts, adhesives, etc.

Figure 8:
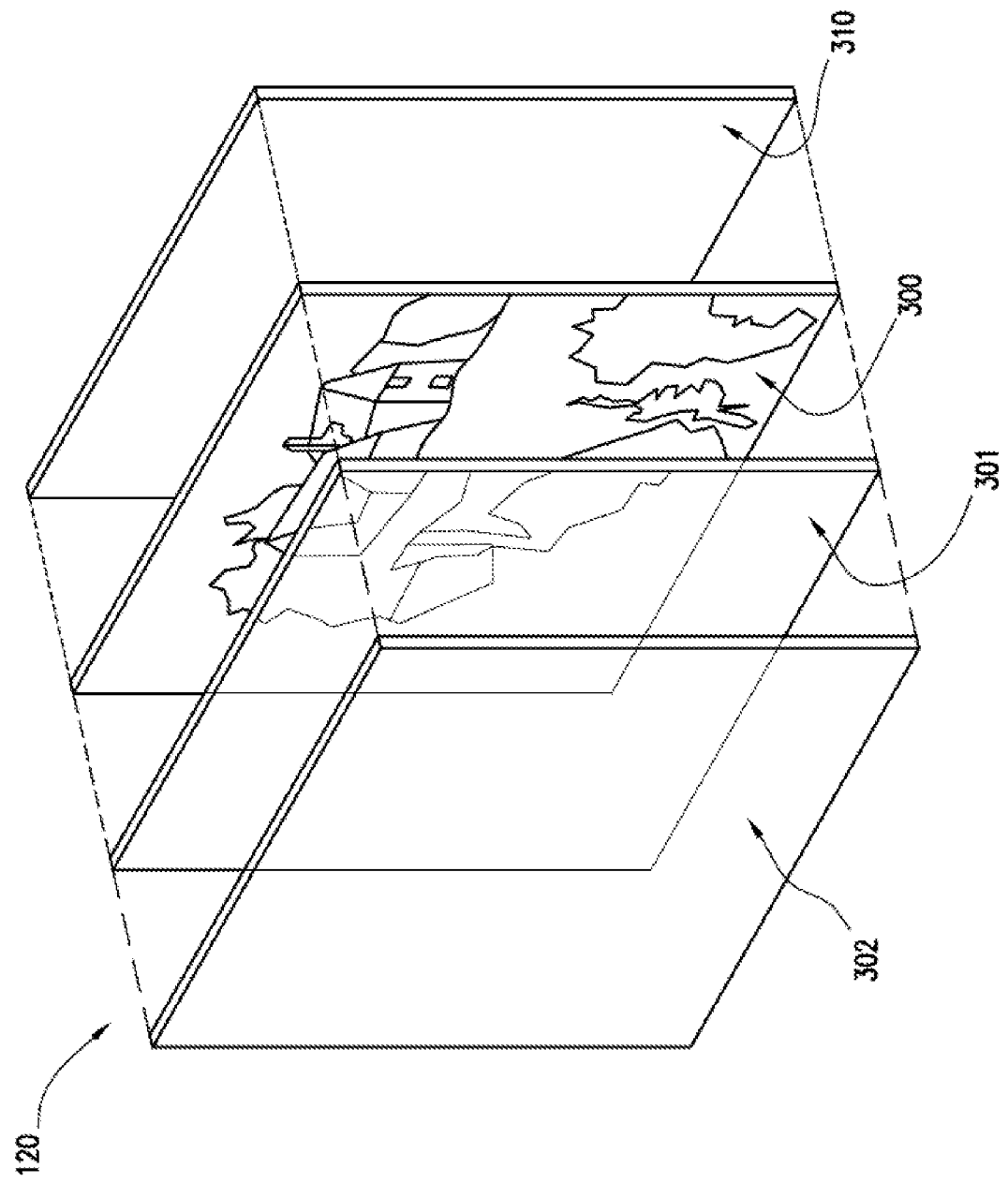
FIG. 8 illustrates an example container assembly for a load, in accordance with certain embodiments of the present disclosure.

FIG. 8 illustrates an example container assembly for a load 120, in accordance with certain embodiments of the present disclosure. In general, FIG. 8 illustrates load 120 arranged using a panel system that places a substantially flat object 300, such as a painting, between panels on the front and back sides of the object. Substantially airtight air gaps (i.e., sealed air compartments) between object 300 and the panels increase stiffness and reduce vibration movement across object 300. In the example illustrated in FIG. 8, a three-panel system comprises, in order, a back panel 310, object 300, front panel 301, and stiffener panel 302. Back panel 310 is positioned behind object 300 and offset by a first sealed air compartment, front panel 301 is positioned in front of object 300 and offset by a second sealed air compartment, and stiffener panel 302 is positioned in front of front panel 301 and offset by a third sealed air compartment. In an alternate embodiment, load 120 may be a two-panel system, comprised of, in order, back panel 310, object 300, and front panel 301, without stiffener panel 302.

Using panels that are relatively stiffer than object 300 and that are offset by sealed air compartments may control vibrations across object 300. For example, in the embodiment illustrated in FIG. 8, back panel 310 imparts its rigidity onto object 300, stiffener panel 302 imparts its rigidity onto front panel 301, and front panel 301 further imparts its rigidity onto object 300. This result is based on principles of the Universal Gas Law applied to flat planes within a control volume system. The gas trapped in any sealed air compartment acts to resist motion of one panel due to the resistance in motion of the other panel and resulting compression of the trapped gas. The effect is to quiet the motion of a flexible panel with a more rigid panel and ultimately to reduce the load on the object during transit and handling. The size of the offset between the planes can be tuned in order to minimize the motion of the flexible panel while maintaining enough of an offset to prevent the planes from colliding during any remaining vibration. For example, in the ideal case of two perfectly flat planes, the stiffness of a 0.125 inch air gap is exceedingly high. For a displacement of 0.001 inches the restoring force between the two planes is approximately 17 pounds per square foot, assuming sea level air pressures, room temperature, and normal levels of humidity. For small gaps, the mechanical stiffness between two planes is higher than casual observation would seem to indicate.

In certain embodiments, the panel system may be tuned to raise the natural frequency of object 300. As an example, assume the natural frequency of the canvas is 7 Hz. Back panel 310 can be configured to double the natural frequency of the canvas (from 7 Hz to 14 Hz in the example). Front panel 301 can be configured to increase the natural frequency of the canvas-and-back panel configuration by about one-third (from 14 Hz to 21 Hz in the example). Stiffener panel 302 can be configured to double the natural frequency of the canvas-back panel-and-front panel configuration (from 21 Hz to 42 Hz in the example). Other embodiments may tune the natural frequency to any suitable value. As an example, for an object 300 having a natural frequency in the range of 1 Hz to 20 Hz, the first sealed air compartment could be dimensioned so as to increase the natural frequency of object 300 by at least 20%, the second sealed air compartment could be dimensioned so as to increase the natural frequency of object 300 by at least 20%, and the third sealed air compartment could be dimensioned so as to increase the natural frequency of object 300 by at least 20%. Additionally, the combination of the first, second, and third sealed air compartments could be configured to increase the natural frequency of the object to at least 40 Hz. In certain embodiments, the panel system can prevent high displacement excursions, such as excursions greater than 350 microns. This may prevent movement or sagging that can occur when a stretched canvas is tipped, knocked over, or placed in a horizontal orientation.

The use of small-volume, static gas piston principals to impart the high natural frequency and low excursion properties of the rigid panels to the less rigid object 300 may allow for limiting undesirable excursions and raising the natural frequency of object 300 without direct mechanical contact between object 300 and the other panels. For example, in embodiments where object 300 comprises a painting, air pistons prevent front panel 301, stiffener panel 302, and back panel 310 from directly touching the face of the canvas.

Figure 9:
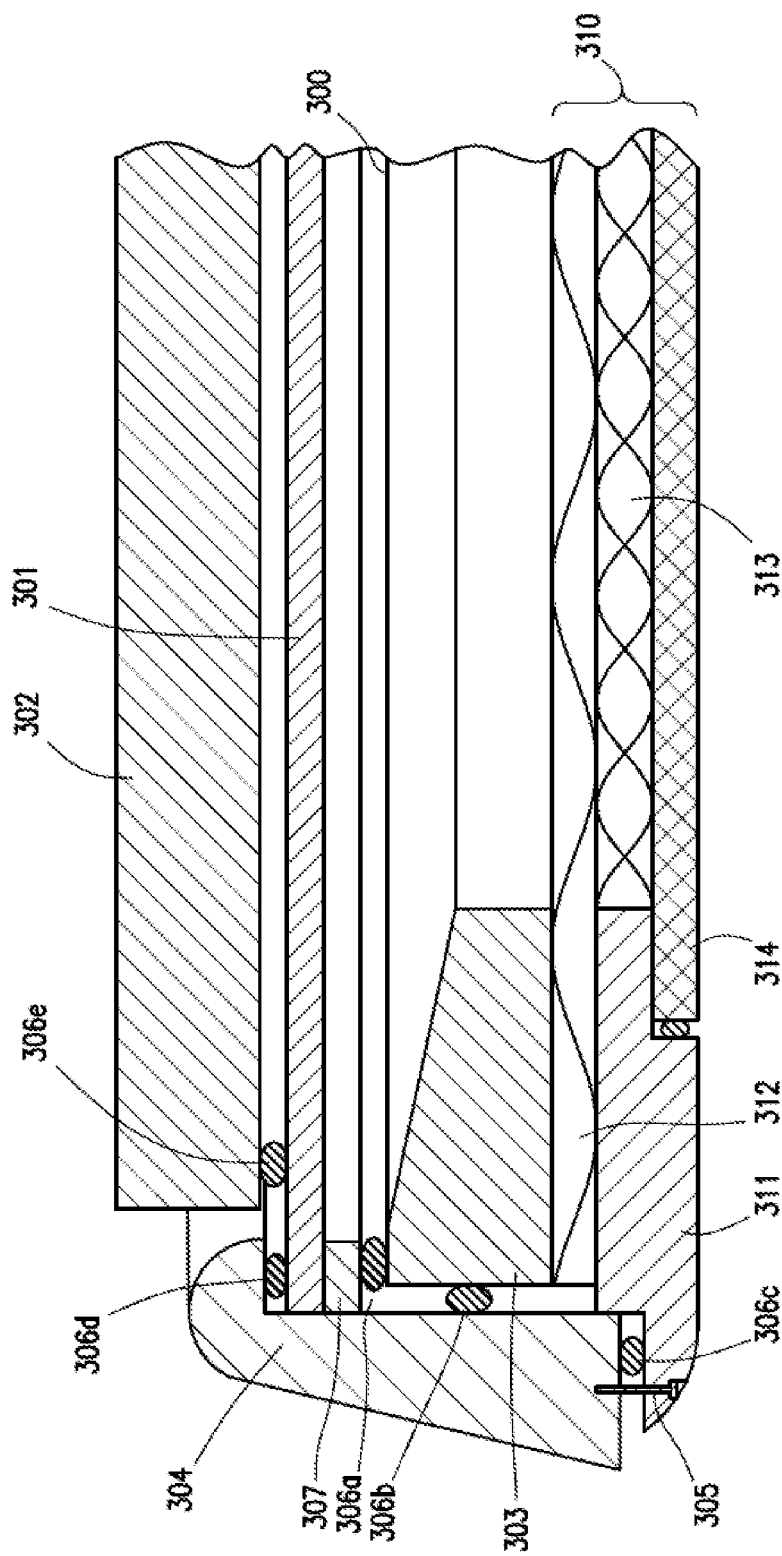
FIG. 9 illustrates an example container assembly for a load, in accordance with certain embodiments of the present disclosure.

FIG. 9 illustrates an example container assembly for a load 120, in accordance with certain embodiments of the present disclosure. FIG. 9 illustrates load 120 as including an object 300 configured within a panel system. Object 300 may be a painting, canvas, or other thin-membrane artifact susceptible to vibration. Object 300 may be mounted on stretcher 303. Stretcher 303 may provide a support structure, such as a wooden frame, and the edges of object 300 (e.g., the canvas) wrap around the sides of stretcher 303. In certain embodiments, object 300 may be affixed to stretcher 303 using nails. Stretcher 303 may also incorporate cross members for added rigidity. Object 300 (stretched on stretcher 303) may be mounted in a frame 304, such as a gallery frame or other art frame. Frame 304 may include a recessed edge or rabbet within which object 300 may be mounted.

As further described below, load 120 includes a plurality of gaskets 306 to seal components of load 120 in place. Any suitable gaskets 306 may be used, such as closed cell polyethylene gaskets. In certain embodiments, a gasket 306 may form an air gap between components sealed by the gasket 306. As an example, a gasket 306 may be used to form an air gap between two panels. As another example, a gasket 306 (gasket 306b) may be used to seal and/or form an air gap between object 300 and frame 304. In certain embodiments, gaskets 306 may be selected to provide an air gap with a depth in the range of 3-5 millimeters. Load 120 may be pressure fit to compress the various gaskets.

FIG. 9 illustrates an embodiment in which the panel system includes a front panel 301, an optional stiffener panel 302, and back panel 310. In certain embodiments, front panel 301 comprises a transparent glazing such as acrylic or glass that is relatively stiffer than object 300. In certain embodiments, the front panel has a thickness in the range of approximately 3-5 millimeters. Gasket 306a creates a sealed air compartment between object 300 and front panel 301. In certain embodiments, gasket 306a is a 3-5 millimeter closed cell polyethylene gasket positioned between object 300 and front panel 301. A spacer 307 may be used to increase the depth of the air gap between object 300 and front panel 301. The spacer 307 in combination with gasket 306a keep the front panel in close proximity to the face of the object to increase stiffness, but sufficiently offset to ensure there are not collisions between front panel 301 and object 300 during transit and handling. As an example, spacer 307 may comprise a polycarbonate material and may have a height in the range of approximately 1-5 millimeters, such as 3 millimeters. Thus, in certain embodiments, gasket 306a together with spacer 307 form an air gap between the surface of object 300 and front panel 301 having a depth in the range of approximately 4-10 millimeters, such as 6-8 millimeters. Front panel 301 may be sealed within the rabbet portion of frame 304 by another gasket (gasket 306d).

Stiffener panel 302 is an optional panel that can be used to provide additional rigidity to load 120. Stiffener panel 302 comprises any suitable material, such as paper honeycomb board or an aluminum honeycomb panel. To impart more stiffness to object 300, stiffener panel 302 may be more rigid than front panel 301 (which as discussed above may be an acrylic glazing in certain embodiments). Stiffener panel 302 seals to front panel 301 using gasket 306e. In certain embodiments, the gas gap between stiffener panel 302 and front panel 301 is smaller in depth than the gas gap between front panel 301 and object 300. Making the stiffener panel 302-to-front panel 301 gas gap smaller that the front panel 301-to-object 300 gas gap makes the stiffener panel 302-to-front panel 301 gas gap significantly more rigid in compression. Thus, stiffener panel 302 meaningfully reduces the vibration of the entire system by reducing deflection under load of front panel 301, thereby relieving the strain on object 300. In certain embodiments, gasket 306e comprises a 3-5 millimeter closed cell polyethylene gasket operable to produce a substantially airtight seal between stiffener panel 302 and front panel 301. In certain embodiments, stiffener panel 302 is held in place by a clamp, tape, straps, or a box surrounding the complete assembly of load 120.

Back panel 310 may be coupled to the reverse side of stretcher 303 and may form a continuous seal along the reverse side of stretcher 303. For example, back panel 310 may comprise a backing frame 311 that couples to frame 304 via gasket 306c, wherein gasket 306c is operable to provide a substantially airtight seal. In certain embodiments, gasket 306c is a 3-5 millimeter closed cell polyethylene gasket. One or more fasteners 305 may be used to secure backing frame 311 to frame 304. Examples of fasteners 305 include a screw, nail, bolt, adhesive, etc. Note that gasket 306c provides a gap between frame 304 and the backing frame 311 portion of back panel 310. The gap between back panel 310 and object 300 may be relatively large, for example approximately three-quarters of an inch, depending on the depth of stretcher 303 and/or the thickness of back panel 310.

In certain embodiments, back panel 310 further comprises a decontamination layer 312, a humidity control layer 313, and a back board 314. Decontamination layer 312 may be positioned behind stretcher 303 and may be operable to scavenge volatile organic compounds (VOCs), such as acid or aldehyde, or other contaminants emitted by object 300. As an example, a paper board comprising clay and/or activated charcoal (e.g., zeolite clay and activated charcoal embedded paper boards) may be used in decontamination layer 312.

Humidity control layer 313 may be operable to stabilize humidity. In certain embodiments, humidity control layer 313 comprises a polypropylene felt containing a silica gel. The silica gel is conditioned to maintain acceptable humidity within frame 304. A dust cover may be positioned between humidity control layer 313 and object 300 to prevent silica dust from getting on object 300.

Back board 314 provides stiffness to back panel 310 such that back panel is relatively stiffer than object 300. Back board 314 may comprise a substantially rigid foam board. In certain embodiments, back board 314 comprises a foam core polystyrene board or other material which may provide thermal insulation to prevent rapid temperature fluctuations. In certain embodiments, back board 314 may further comprise an aluminum layer (e.g., a layer on or within the foam board) operable to stabilize humidity. As an example, back board may comprise a commercial product such as MAR-VELSEAL®, an aluminized polyethylene film for vapor proofing and humidity control.

Thus, back panel 310 may provide microclimate control by configuring one or more environmental buffers (e.g., humidity control layer 313 and/or back board 314) to provide humidity and/or thermal protection. Microclimate control may refer to environmental buffers within back panel 310 or within the sealed compartment formed between back panel 310 and object 300. Certain embodiments may also provide macroclimate control by configuring additional environmental buffers within case 200. Examples of environmental buffers for macroclimate control include thermal phase change tiles and/or silica gel tiles that can attach to an interior-facing wall or door of case 200 and/or can attach on or within platform 110.

An alternative embodiment of load 120 reduces the corner volume on stiffener panel 302, which increases stiffness still further, by reducing the amount of compressible gas in the third sealed air compartment without increasing the likelihood of a collision between front panel 301 and stiffener panel 301 during heavy shock loading of the whole system, such as might occur if load 120 was dropped. That is, reducing the corner volume of stiffener panel 302 in turn reduces the corner volume of the third sealed air compartment between stiffener panel 302 and front panel 301, resulting in a lower volume of compressible gas in the third sealed air compartment that enhances the stiffening effect imparted on front panel 301 from stiffener panel 302. This enhanced stiffening occurs where the volume of trapped air is reduced while still maintaining the same surface area on the face of front panel 301. This may be achieved through methods such as producing a concave geometry on the surface of stiffener panel 302 that extends into the third sealed air compartment to occupy space and/or producing a stiffener panel 302 having a non-uniform thickness. This geometry may be possible through using additive techniques such as three-dimensional printing. This may further be achieved by using a non-rectangular geometry for gasket 306e, such as an oval shape, that would eliminate the corners where the displacement of a vibrating panel would be minimal.

Although FIG. 9 illustrates one example arrangement of gaskets 306, other embodiments may use different arrangements of gaskets 306. As an example, with larger air gaps between backing panel 310 and object 300 or between front panel 301 and stiffener panel 302 on a relatively large canvas (e.g., 2 meter×4 meter) the gas piston space may be broken into several smaller gas piston spaces by using gasketing to divide one large space into several smaller spaces, thus adding the rigidity of a smaller panel.

The various components described with respect to FIGS. 1-9 may be combined to form a vibration isolation system. The vibration isolation system may use any suitable combination of components, such as isolators 130, panels (e.g., front panel 301, back panel 310, and optionally stiffener panel 302), and/or other components. Examples of other components include one or more sensors that may optionally be mounted in or on case 200, load 120, and/or object 300. Sensors may monitor and record vibrations and shocks occurring during transit, pressurization conditions, environmental conditions, GPS coordinates, surveillance cameras, and/or other suitable information. Additional examples of other components include humidity buffers, thermal controls (e.g., insulation materials, heating and cooling units, etc.), or other components selected to maintain optimal environmental conditions within case 200.

The combination of components may be selected and tuned based on the object that the vibration isolation system protects. As an example, a system for protecting a stretched canvas or similar object may include a panel system tuned to increase the natural frequency of the canvas to at least 40 Hz and isolators 130 tuned to yield a tuning ratio greater than or equal to 1.4.

The tuning ratio is determined by dividing a natural frequency of object 300 that the vibration-isolating system protects by a natural frequency of the vibration-isolating system. For an isolation system to work, the natural frequency of the thing to be isolated (e.g., object 300 within load 120) must be higher than the natural frequency of the isolation system. Over most of the spectrum, the number at which amplification starts to change to isolation is a ratio of 1.4, which is the square root of 2 approximated to the nearest one-tenth. If the natural frequency of the thing to be isolated divided by the natural frequency of the isolation system is less than 1.4, then amplification will occur. Thus, the tuning ratio for achieving true, critical damping over most of the spectrum may be expressed according to the following formula:

$$(F_P \div F_I) \geq 1.4$$

In the formula, the tuning ratio is expressed as $(F_P \div F_I)$, where $F_P$ refers to the natural frequency of the payload being protected by the vibration-isolating system (e.g., object 300), and $F_I$ refers to the natural frequency of the vibration-isolating system. As an example, applying the formula to a scenario in which the natural frequency of the payload being protected (Fp) equals 14 Hz, the natural frequency of the vibration-isolating system $(F_I)$ would be less than or equal to 10 Hz in order to yield a tuning ratio greater than or equal to 1.4.

As an example, a vibration isolation system may be tuned to protect a painting on a canvas. A canvas tends to have the lowest natural frequency and is the most flexible as compared to other art media, such as glass, marble, or ceramic sculptures and artifacts. Thus, the vibration-isolating system can be built to be able to isolate the lowest frequencies (the frequencies associated with canvases) and can then be tuned according to the natural frequency of the object being isolated (e.g., canvas, glass, marble, or ceramic, and so on).

For purposes of the example, assume the natural frequency of the canvas is 7 Hz. To achieve a tuning ratio greater than 1.4 for the canvas, wire rope isolators 130 would be tuned to a natural frequency less than or equal to 5 Hz (i.e., 7 Hz divided by 1.4). However, configuring a wire thickness, number of loops, loop diameter, loop spacing, number of wires in a rope braid, number of wire rope isolators 130, angle of orientation of wire rope isolators 130 relative to platform 110, and/or position of wire rope isolators 130 relative to the platform 110 to achieve a natural frequency of 5 Hz may be impractical. For example, tuning wire rope isolators 130 to a frequency as low as 5 Hz may require a relatively large wire thickness that can be difficult to form into a small loop and may thus have a large loop diameter. Wire rope isolators 130 with a wire thickness and loop diameter large enough to isolate low frequencies may take up too much space within case 200. To address this problem, the panel system described with respect to FIGS. 8-9 can be used to increase the natural frequency of the canvas, which in turn increases the natural frequency to which wire rope isolators 130 would be tuned.

Continuing with the example, back panel 310 can be configured to double the natural frequency of the canvas (from 7 Hz to 14 Hz in the example). To achieve a tuning ratio greater than 1.4 for the canvas-and-back panel 310 configuration, wire rope isolators 130 would be tuned to a natural frequency less than or equal to 10 Hz (i.e., 14 Hz divided by 1.4). The natural frequency of the canvas can be further increased with the addition of front panel 301. Front panel 301 can be configured to increase the natural frequency of the canvas-and-back panel 301 configuration by about one-third (from 14 Hz to 21 Hz in the example). To achieve a tuning ratio greater than 1.4 for the canvas-and-back panel 310-and-front panel 301 configuration, wire rope isolators 130 would be tuned to a natural frequency less than or equal to 15 Hz (i.e., 21 Hz divided by 1.4). The natural frequency of the canvas can be further increased with the addition of stiffener panel 302. Stiffener panel 302 can be configured to double the natural frequency of the canvas-and-back panel 301-and-front panel 302 configuration (from 21 Hz to 42 Hz in the example). To achieve a tuning ratio greater than 1.4 for the configuration that includes the canvas, back panel 310, front panel 301, and stiffener panel 302, wire rope isolators 130 would be tuned to a natural frequency less than or equal to 30 Hz (i.e., 42 Hz divided by 1.4). In certain embodiments, the panel system may be tuned to achieve a natural frequency in the range of approximately 40-70 Hz for object 300, and wire rope isolators may be tuned to a natural frequency less than or equal to 50 Hz (i.e., 70 Hz divided by 1.4), such as a natural frequency less than or equal to approximately 28.6 Hz (i.e., 40 Hz divided by 1.4).

Certain embodiments of the present disclosure may provide one or more technical advantages. Certain embodiments may protect an object from damage due to vibrations, displacement, impact, temperature, and/or humidity. As discussed above, any suitable combination of the components described herein can be used to provide the desired protections.

Vibration protection can be provided by a combination of a suspension system comprising isolators 130 and/or the panel system. In certain embodiments, a panel system can be tuned to increase the natural frequency of the canvas to at least 40 Hz, and isolators 130 can be tuned to yield a tuning ratio greater than or equal to 1.4.

Excursion protection can be provided by the panel system. The panel system can impart stiffness to the canvas that protects against excursions. In certain embodiments, the panel system limits excursions at the most flexible point (the middle of the canvas) to a value that does not affect the adhesion or cohesion of the paint to the canvas. For example, panel system can be configured to limit excursions greater than 350 microns. In certain embodiments, the stiffness imparted by the panel system can prevent sagging of the canvas in the event that the panel system is tilted and can reduce the likelihood of the canvas coming into contact with its glazing, for example, in the event that a person inadvertently presses on the stiffener panel.

Impact protection can be provided by the suspension system (e.g., wire rope isolators 130), shock absorbing structures, and/or case 200 (e.g., a case comprising plastic, polycarbonate honeycomb, polypropylene honeycomb, honeycomb composite, or other material that deforms on impact and absorbs some of the energy of the impact). In certain embodiments, impact protection components are configured to limit the total G force in an impact resulting from a drop of up to one meter. For example, impact protection components can be configured to reduce the total impact shock to below 20 G. As discussed above, a foam structure, such as a mass of smartfoam, can be positioned within a wire rope isolator 130 to act as a safety stop that prevents wire rope isolator 130 from crimping or creasing in the event of an impact.

Temperature protection can be provided by macroclimate controls within case 200 and/or microclimate controls within back panel 310 of the panel system. As an example, the macroclimate control may use thermal phase change materials (e.g., tiles encased within platform 110 and/or tiles that snap in and out of case 200) to maintain an internal temperature within case 200. For example, the temperature may be maintained at 22° C., plus or minus 4° C., given an exterior fluctuation of 22° C., plus or minus 10° C. In other words, for exterior temperatures in the range of 12° C. to 32° C., the temperature within case 200 may be maintained in the range of 18° C. to 26° C.

Humidity protection can be provided by macroclimate controls within case 200 and/or microclimate controls within back panel 310 of the panel system. As an example, the macroclimate control may use silica gel felt within case 200 to maintain humidity within the range of 40% to 60% humidity given an internal temperature in the range of 18° C. to 26° C.

As a more specific example of combining the various components disclosed herein, an embodiment for transporting a stretched canvas or similar object comprises a case 200 configured with thermal phase change material, humidity control material, wire rope isolators 130, and a panel system comprising front panel 301, stiffener panel 302, and back panel 310, wherein the back panel 310 is configured to provide microclimate control. The thermal phase change material provides lightweight insulation that absorbs and releases thermal energy in order to avoid significant temperature fluctuations within case 200. In certain embodiments, the thermal phase change material is implemented using tiles (e.g., tiles encased within platform 110 and/or tiles that snap in and out of case 200). The humidity control material can be implemented using silica gel tiles that can attach inside the doors of case 200. Wire rope isolators 130, such as those discussed with respect to FIGS. 2-6, isolate platform 110 and load 120 from damaging vibration frequencies. For example, wire rope isolators can be tuned to yield a tuning ratio greater than or equal to 1.4, the tuning ratio determined by dividing a natural frequency of an object that the vibration-isolating system protects by a natural frequency of the vibration-isolating system. Case 200 can be configured with shock absorbing structures, such as XPS core, polypropylene honeycomb structures, or other shock absorbing structures to absorb the impact from shock in the event case 200 is dropped. The panel system stabilizes the canvas against high displacement excursions, such as excursions greater than 350 microns. For example, as discussed with respect to FIGS. 8-9, a stiffener panel 302 in combination with front panel 301 and back panel 310 provides rigidity to load 120. The back panel 310 is further configured to provide microclimate control. For example, back panel 310 comprises back board 314 (e.g., insulating foam core board that can include a vapor barrier, such as an aluminized polyethylene film) and/or humidity control layer 313 (e.g., silica gel felt).

Certain embodiments may have all, some, or none of the above-identified advantages. Other advantages will be apparent to persons of ordinary skill in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A vibration-isolating system, comprising:
a case;
a platform adapted to carry one or more loads, the platform suspended within the case in a vertical orientation when the case is upright, the platform suspended by first, second, third, and fourth high energy rope mounts (HERMs) tuned to impede vibrations in a pre-determined frequency range that encompasses 10-40 Hz for a payload having a pre-determined mass in the range of 80-100 kilograms; and
an adjustable load-positioning system adapted to facilitate positioning the one or more loads such that the payload having the pre-determined mass is centered at the center of gravity of the platform, the adjustable load-positioning system comprising one or more horizontal rails that facilitate moving a load along the length of the platform and one or more vertical rails that facilitate moving the load along the height of the platform;
wherein:
the platform comprises a load-bearing surface having a rectangular shape;

the first HERM is positioned proximate a first corner of the load-bearing surface;
the second HERM is positioned proximate a second corner of the load-bearing surface;
the third HERM is positioned proximate a third corner of the load-bearing surface;
the fourth HERM is positioned proximate a fourth corner of the load-bearing surface; and
each of the HERMs is positioned at an angle such that an axis through a diameter of the respective HERM bisects the center of the load-bearing surface of the platform, the first HERM diagonally opposes the second HERM, and the third HERM diagonally opposes the fourth HERM.

2. A vibration-isolating system, comprising:
a platform adapted to carry one or more loads, the platform suspended within a support structure by a plurality of isolators tuned to impede vibrations in a pre-determined frequency range for a payload having a pre-determined mass; and
an adjustable load-positioning system adapted to facilitate positioning the one or more loads such that the payload having the pre-determined mass is centered at the center of gravity of the platform;
wherein:
the platform comprises a load-bearing surface having a rectangular shape suspended in a vertical orientation relative to ground when the support structure is upright;
the plurality of isolators comprises first, second, third, and fourth isolators positioned such that when the support structure is upright:
the first isolator suspends a top-left corner of the load-bearing surface;
the second isolator suspends a bottom-right corner of the load-bearing surface, the first isolator and the second isolator angled in diagonal opposition such that when the first isolator undergoes tension the second isolator undergoes compression;
the third isolator suspends a top-right corner of the load-bearing surface; and
the fourth isolator suspends a bottom-left corner of the load-bearing surface, the third isolator and the fourth isolator angled in diagonal opposition such that when the third isolator undergoes tension the fourth isolator undergoes compression.

3. The vibration-isolating system of claim 2, wherein:
a center of gravity of the platform is located where the diagonal extending from the first isolator to the second isolator intersects the diagonal extending from the third isolator to the fourth isolator.

4. The vibration-isolating system of claim 2, wherein each of the first, second, third, and fourth wire rope isolators is a high energy rope mount (HERM) comprising a wire rope embedded in an elastomer.

5. The vibrating-isolating system of claim 2, wherein:
the first isolator is a wire rope isolator comprising a plurality of loops held in place by a first bracket and a second bracket, wherein the first bracket and the second bracket each extend tangentially across the first wire rope isolator, and wherein the second bracket is positioned opposite the first bracket; and
the support structure comprises a rectangular frame and the vibration-isolating system further comprises a mounting assembly that couples the first wire rope isolator to the rectangular frame, the mounting assembly comprising:
a first mount positioned in a corner of the rectangular frame such that the first mount couples diagonally between two sides of the rectangular frame, wherein the first mount connects to the first bracket of the first wire rope isolator; and
a second mount comprising an angled portion that connects to the second bracket of the first wire rope isolator and a flat portion that couples to the platform proximate the top-left corner of the platform;
wherein the first mount and the second mount hold the first wire rope isolator at an angle such that an axis through a diameter of the first wire rope isolator bisects the center of the load-bearing surface of the platform.

6. The vibration-isolating system of claim 2, wherein the pre-determined frequency range encompasses 10-40 Hz and the pre-determined mass is in the range of 80-100 kilograms.

7. The vibration-isolating system of claim 2, further comprising the one or more loads, wherein a combined mass of the platform, the adjustable load-positioning system, and the one or more loads satisfy the pre-determined mass of the payload to which the plurality of isolators are tuned.

8. The vibration-isolating system of claim 7, wherein a first load of the one or more loads comprises a flexible panel.

9. The vibration-isolating system of claim 8, wherein the first load further comprises a container assembly operable to protect the flexible panel, the container assembly comprising:
a back panel positioned behind the flexible panel and offset by a first substantially airtight compartment;
a front panel positioned in front of the flexible panel and offset by a second substantially airtight compartment; and
a stiffener panel positioned in front of the front panel and offset by a third substantially airtight compartment.

10. The vibration-isolating system of claim 9, wherein a first load of the one or more loads comprises a mass unit having a specified mass adapted to tune the combined mass of the platform, the adjustable load-positioning system, and the one or more loads to satisfy the pre-determined mass of the payload to which the plurality of isolators are tuned.

11. The vibration-isolating system of claim 10, wherein the mass unit comprises a thermal phase change material, an inelastic particulate material, or both.

12. The vibration-isolating system of claim 2, wherein the adjustable load-positioning system comprises:
one or more horizontal rails that facilitate moving a load along the length of the platform; and
one or more vertical rails that facilitate moving the load along the height of the platform.

13. The vibration-isolating system of claim 2, wherein the adjustable load-positioning system comprises:
a first set of brackets adapted to hold a first load of the one or more loads onto the platform, each bracket having an L-shaped portion adapted to hold a respective corner of the first load;
wherein the adjustable load-positioning system facilitates:
adjusting a position of the first set of brackets relative to the horizontal and vertical dimensions of the platform to center the payload; and
securing the first set of brackets in place once the payload has been centered.

14. The vibration-isolating system of claim 13, wherein the vibration-isolating system comprises a case that either provides the support structure within which the platform is suspended or contains the support structure, the vibration-isolating system further comprising:

a second set of brackets adapted to hold a second load of the one or more loads onto the platform, each bracket having an L-shaped portion adapted to hold a respective corner of the second load;
wherein the adjustable load-positioning system facilitates:
adjusting a position of the second set of brackets relative to the horizontal and vertical dimensions of the platform to center the payload; and
securing the second set of brackets in place once the payload has been centered; and
wherein the first shelf and first set of brackets face the front of the case, and the second shelf and second set of brackets face the back of the case.

15. The vibration-isolating system of claim 2, wherein the support structure within which the platform is suspended comprises a case, the case comprising:
a plurality of panels arranged to form walls of the case, the plurality of panels comprising a front panel that forms the front wall of the case and a back panel that forms the back wall of the case;
a first set of locks that secure the front panel to the case, wherein the front panel is detachable when the first set of locks are unlocked; and
a second set of locks that secure the back panel to the case, wherein the back panel is detachable when the second set of locks are unlocked.

16. The vibration-isolating system of claim 15, wherein the case further comprises:
a first set of guides adapted to align the front panel to the case; and
a second set of guides adapted to align the back panel to the case.

17. The vibration-isolating system of claim 15, wherein each of the plurality of panels comprises polypropylene honey comb panel in aluminum extrusion.

18. The vibration-isolating system of claim 2, wherein the support structure within which the platform is suspended comprises a case, the case comprising an integrated base, wherein the integrated base defines at least two apertures dimensioned to accommodate tynes of a fork lift.

19. The vibration-isolating system of claim 18, wherein the integrated base lowers the center of gravity of the case.

20. The vibration-isolating system of claim 2, wherein the vibration-isolating system comprises a case that either provides the support structure within which the platform is suspended or contains the support structure, the vibration-isolating system further comprising one or more one or more shock-absorbing structures positioned within the case, the one or more shock-absorbing structures comprising one or more of the following materials: polycarbonate, polypropylene, impact-endothermic open cell polyurethane foam, and/or expanded polystyrene (XPS).

21. The vibration-isolating system of claim 2, wherein the vibration-isolating system comprises a case that either provides the support structure within which the platform is suspended or contains the support structure, the vibration-isolating system further comprising one or more silica gel tiles and/or thermal phase change tiles positioned within the case.

22. A vibration-isolating system, comprising:
a platform adapted to carry one or more loads, the platform suspended within a support structure such that a load-bearing surface of the platform is suspended in a vertical orientation relative to ground when the support structure is upright, the platform suspended by a plurality of isolators tuned to impede vibrations in a pre-determined frequency range for a payload having a pre-determined mass; and
an adjustable load-positioning system adapted to facilitate positioning the one or more loads such that the payload having the pre-determined mass is centered at the center of gravity of the platform;
wherein:
the adjustable load-positioning system comprises one or more sets of brackets, each set of brackets adapted to hold a respective load of the one or more loads onto the platform, each bracket having an L-shaped portion adapted to hold a respective corner of the respective load; and
the adjustable load-positioning system facilitates:
adjusting the position of the brackets relative to the horizontal and vertical dimensions of the platform to center the payload at the center of gravity of the platform; and
securing the brackets in place once the payload has been centered at the center of gravity of the platform.

23. A vibration-isolating system, comprising:
a platform adapted to carry one or more loads, the platform suspended within a support structure such that a load-bearing surface of the platform is suspended in a vertical orientation relative to ground when the support structure is upright, the platform suspended by a plurality of isolators tuned to impede vibrations in a pre-determined frequency range for a payload having a pre-determined mass; and
an adjustable load-positioning system adapted to facilitate:
holding at least a first load and a second load onto the same side of the platform; and
independently adjusting the position of the first load and the position of the second load relative to the horizontal and vertical dimensions of the platform such that the payload having the pre-determined mass is centered at the center of gravity of the platform.

24. A vibration-isolating system, comprising:
one or more loads;
a platform adapted to carry the one or more loads, the platform suspended within a support structure such that a load-bearing surface of the platform is suspended in a vertical orientation relative to ground when the support structure is upright, the platform suspended by a plurality of isolators tuned to impede vibrations in a pre-determined frequency range for a payload having a pre-determined mass; and
an adjustable load-positioning system adapted to facilitate positioning the one or more loads such that the payload having the pre-determined mass is centered at the center of gravity of the platform;
wherein at least one of the loads comprises a mass unit having a specified mass adapted to tune a combined mass of the platform, the adjustable load-positioning system, and the one or more loads to satisfy the pre-determined mass of the payload to which the plurality of isolators are tuned.

* * * * *